(12) United States Patent
Hasegawa et al.

(10) Patent No.: US 11,843,210 B2
(45) Date of Patent: Dec. 12, 2023

(54) ROTARY CONNECTOR DEVICE

(71) Applicants: FURUKAWA ELECTRIC CO., LTD., Tokyo (JP); FURUKAWA AUTOMOTIVE SYSTEMS INC., Inukami-gun (JP)

(72) Inventors: Yuya Hasegawa, Inukami-gun (JP); Syuji Hirai, Inukami-gun (JP); Hirofumi Utsunomiya, Inukami-gun (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 203 days.

(21) Appl. No.: 17/406,080

(22) Filed: Aug. 19, 2021

(65) Prior Publication Data
US 2021/0384687 A1    Dec. 9, 2021

Related U.S. Application Data

(63) Continuation of application No. PCT/JP2020/006525, filed on Feb. 19, 2020.

(30) Foreign Application Priority Data

Feb. 21, 2019  (JP) .................................. 2019-029818
Feb. 21, 2019  (JP) .................................. 2019-029819
Mar. 5, 2019   (JP) .................................. 2019-039467

(51) Int. Cl.
*H01R 39/00*    (2006.01)
*H01R 35/04*    (2006.01)
(Continued)

(52) U.S. Cl.
CPC ......... *H01R 35/04* (2013.01); *H01R 13/5227* (2013.01); *B60R 16/027* (2013.01); *H01R 2201/26* (2013.01)

(58) Field of Classification Search
CPC ................ H01R 35/04; H01R 13/5227; H01R 2201/26; B60R 16/027
(Continued)

(56) References Cited

U.S. PATENT DOCUMENTS 6,261,112 B1 * 7/2001 Mitsui .................. B60R 16/027
                                                                       439/15
6,390,838 B1 * 5/2002 Kawamura .......... H01R 35/025
                                                                       439/164

(Continued)

FOREIGN PATENT DOCUMENTS

CN    108886226    11/2018
CN    109075515    12/2018
(Continued)

OTHER PUBLICATIONS

Japanese Office Action for corresponding JP Application No. 2019-029818, dated Aug. 2, 2022 (w/ English machine translation).
(Continued)

*Primary Examiner* — Abdullah A Riyami
*Assistant Examiner* — Vladimir Imas
(74) *Attorney, Agent, or Firm* — Mori & Ward, LLP

(57) ABSTRACT

A rotary connector device includes a stator, a rotor and an electrical connector; the rotor including a rotor main body and a connector housing. The connector housing includes a first connector holder and a second connector holder. The second connector holder includes a second holder main body, a first wall, and a second wall. The first wall extends from the second holder main body along an axial direction parallel to the rotation axis. The second wall extends from
(Continued)

the second holder main body along the axial direction and is coupled to the first wall.

33 Claims, 30 Drawing Sheets

(51) Int. Cl.
  *H01R 13/52* (2006.01)
  *B60R 16/027* (2006.01)
(58) Field of Classification Search
  USPC .......................................................... 439/13
  See application file for complete search history.

(56) References Cited

U.S. PATENT DOCUMENTS

| | | | |
|---|---|---|---|
| 6,764,326 B2* | 7/2004 | Matsumoto | H01R 39/64 439/15 |
| 6,776,634 B2* | 8/2004 | Besier | B60R 16/027 439/164 |
| 6,982,379 B2 | 1/2006 | Saka et al. | |
| 7,223,104 B2* | 5/2007 | Suenaga | H01R 35/04 439/15 |
| 8,758,024 B2* | 6/2014 | Adachi | B60R 16/0207 439/15 |
| 8,808,016 B2* | 8/2014 | Adachi | H02G 11/02 439/164 |
| 8,834,179 B2* | 9/2014 | Park | B60R 16/027 439/15 |
| 8,911,239 B2* | 12/2014 | Yamaguchi | B60R 16/027 439/15 |
| 9,011,162 B2* | 4/2015 | Sato | B60R 16/037 439/15 |
| 9,362,661 B2 | 6/2016 | Hara | |
| 9,472,914 B2* | 10/2016 | Takahashi | H01R 35/025 |
| 10,468,845 B2* | 11/2019 | Asakura | H01R 35/025 |
| 10,554,003 B2* | 2/2020 | Saito | B60R 16/027 |
| 10,686,286 B2* | 6/2020 | Ushiyama | B60R 16/027 |
| 2007/0086152 A1 | 4/2007 | Sasaki et al. | |
| 2012/0011959 A1* | 1/2012 | Park | B60R 16/027 74/527 |
| 2013/0095672 A1 | 4/2013 | Hirai | |
| 2014/0235082 A1* | 8/2014 | Adachi | B60R 16/027 439/164 |
| 2019/0089109 A1 | 3/2019 | Hirai et al. | |
| 2019/0118738 A1 | 4/2019 | Ushiyama | |
| 2019/0165502 A1 | 5/2019 | Hiroki et al. | |
| 2019/0207352 A1 | 7/2019 | Ushiyama | |

FOREIGN PATENT DOCUMENTS

| | | |
|---|---|---|
| CN | 109155475 | 1/2019 |
| EP | 3193409 | 7/2017 |
| JP | H05-032222 U | 4/1993 |
| JP | 10-064646 | 3/1998 |
| JP | 5065508 B2 | 11/2011 |
| JP | 2015-109144 | 6/2015 |
| WO | WO 2017/170650 | 10/2017 |
| WO | WO 2017/170752 | 10/2017 |
| WO | WO 2018/047581 | 3/2018 |

OTHER PUBLICATIONS

International Search Report for corresponding International Application No. PCT/JP2020/006525, dated May 19, 2020.
Extended European Search Report for corresponding EP Application No. 20758822.9-1201, dated Mar. 25, 2022.
Written Opinion for corresponding International Application No. PCT/JP2020/006525, dated Aug. 10, 2021.
Chinese Office Action for corresponding CN Application No. 202080015133.X, dated May 18, 2023 (w/ English machine transltion).

* cited by examiner

ROTARY CONNECTOR DEVICE

CROSS-REFERENCE TO RELATED APPLICATIONS

The present application is a continuation application of International Application No. PCT/JP2020/006525, filed Feb. 19, 2020, which claims priority to Japanese Patent Applications No. 2019-029818 filed Feb. 21, 2019, No. 2019-029819 filed Feb. 21, 2019, and No. 2019-039467 filed Mar. 5, 2019. The contents of these applications are incorporated herein by reference in their entirety.

BACKGROUND

Technical Field

The technology disclosed in the present application relates to a rotary connector device.

Background Art

A rotary connector device used for vehicles is known (e.g., see WO2018/047581 and JP5065508B).

SUMMARY

According to one aspect of the present application, a rotary connector device includes a stator, a rotor, and an electrical connector. The rotor is rotatable about a rotation axis relative to the stator. The electrical connector is attached to the rotor. The stator and the rotor define a cable housing space between the stator and the rotor, wherein the cable housing space is provided to surround the rotation axis. The rotor includes: a rotor main body; and a connector housing having a connector housing space that houses the electrical connector. The connector housing includes a first connector holder and a second connector holder. The first connector holder extends from the rotor main body away from the cable housing space along the rotation axis. The second connector holder is a separate member from the first connector holder and is attached to the first connector holder. The second connector holder includes a second holder main body, a first wall, and a second wall. The second holder main body includes a connector support portion that supports the electrical connector. The first wall extends from the second holder main body along an axial direction parallel to the rotation axis. The second wall extends from the second holder main body along the axial direction and is coupled to the first wall.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
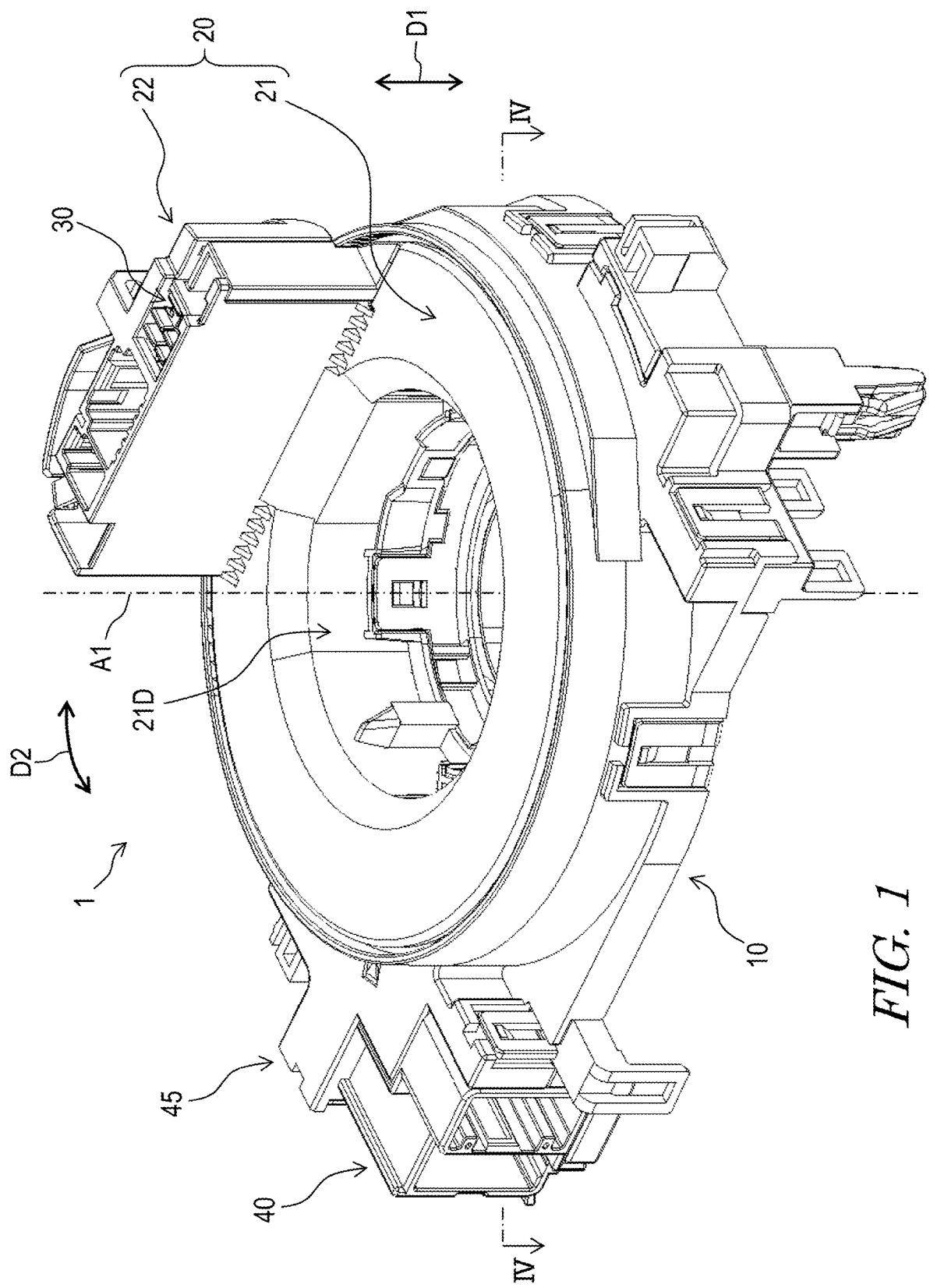
FIG. 1 is a perspective view of a rotary connector device according to a first embodiment.

Hereinafter, embodiments will be described with reference to the drawings. In the drawings, the same reference signs denote corresponding or identical components.

FIG. 1 is a perspective view of a rotary connector device 1 according to an embodiment. As illustrated in FIG. 1, the rotary connector device 1 includes a stator 10, a rotor 20, and an electrical connector 30. The rotor 20 is rotatable around a rotation axis A1 relative to the stator 10. In the present embodiment, for example, the stator 10 is configured to be fixed to a vehicle body, and the rotor 20 is configured to be fixed to a steering wheel. The electrical connector 30 is attached to the rotor 20. The electrical connector 30 is configured to be electrically connected to, for example, a steering side connector. The steering side connector is electrically connected to electric circuits such as switches of a steering wheel and an airbag device. The electrical connector 30 may also be referred to as a rotor-side electrical connector.

Figure 2:
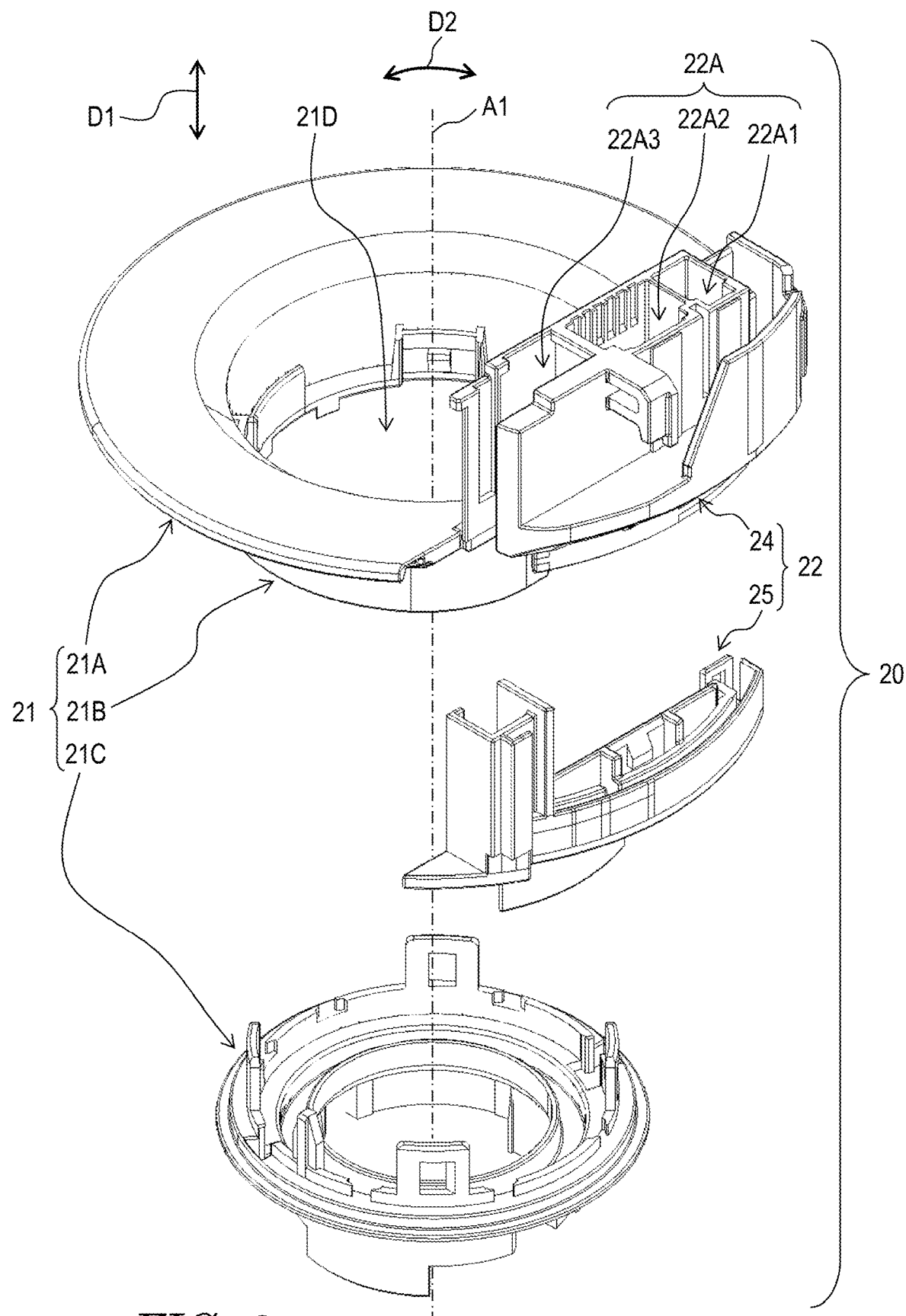
FIG. 2 is an exploded perspective view of a rotor of the rotary connector device illustrated in FIG. 1.

FIG. 2 is an exploded perspective view of the rotor 20 of the rotary connector device 1. As illustrated in FIG. 2, the rotor 20 includes a rotor main body 21. The rotor main body 21 includes a rotating plate 21A, a cylindrical portion 21B, and a sleeve 21C. The rotating plate 21A has a generally annular shape. The cylindrical portion 21B extends from the inner peripheral portion of the rotating plate 21A along the rotation axis A1, and includes a through-hole 21D through which the steering shaft passes. The through-hole 21D extends along the rotation axis A1. The sleeve 21C has an annular shape and is attached to the cylindrical portion 21B.

Figure 7:
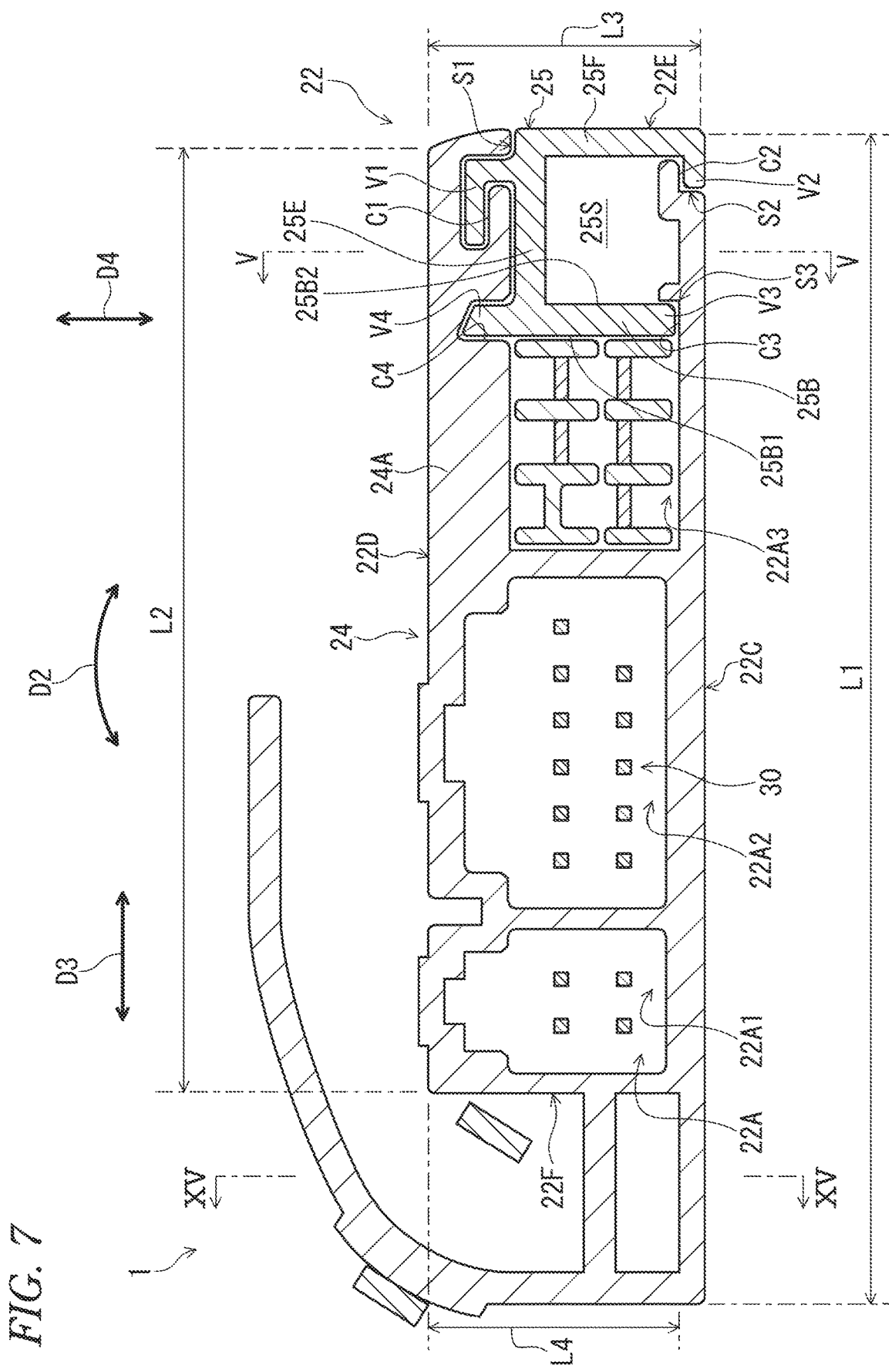
FIG. 7 is a cross-sectional view of the rotary connector device taken along line VII-VII of FIG. 5.

The rotor 20 includes a connector housing 22. The connector housing 22 has a connector housing space 22A that houses the electrical connector 30 (FIG. 7). In the present embodiment, the connector housing space 22A includes a plurality of housing spaces 22A1 to 22A3. The connector housing 22 may also be referred to as a rotor-side connector housing 22.

The connector housing 22 includes a first connector holder 24 and a second connector holder 25. The second connector holder 25 is a separate member from the first connector holder 24, and is attached to the first connector holder 24. The first connector holder 24 extends from the rotor main body 21 along an axial direction D1 parallel to the rotation axis A1.

Figure 3:
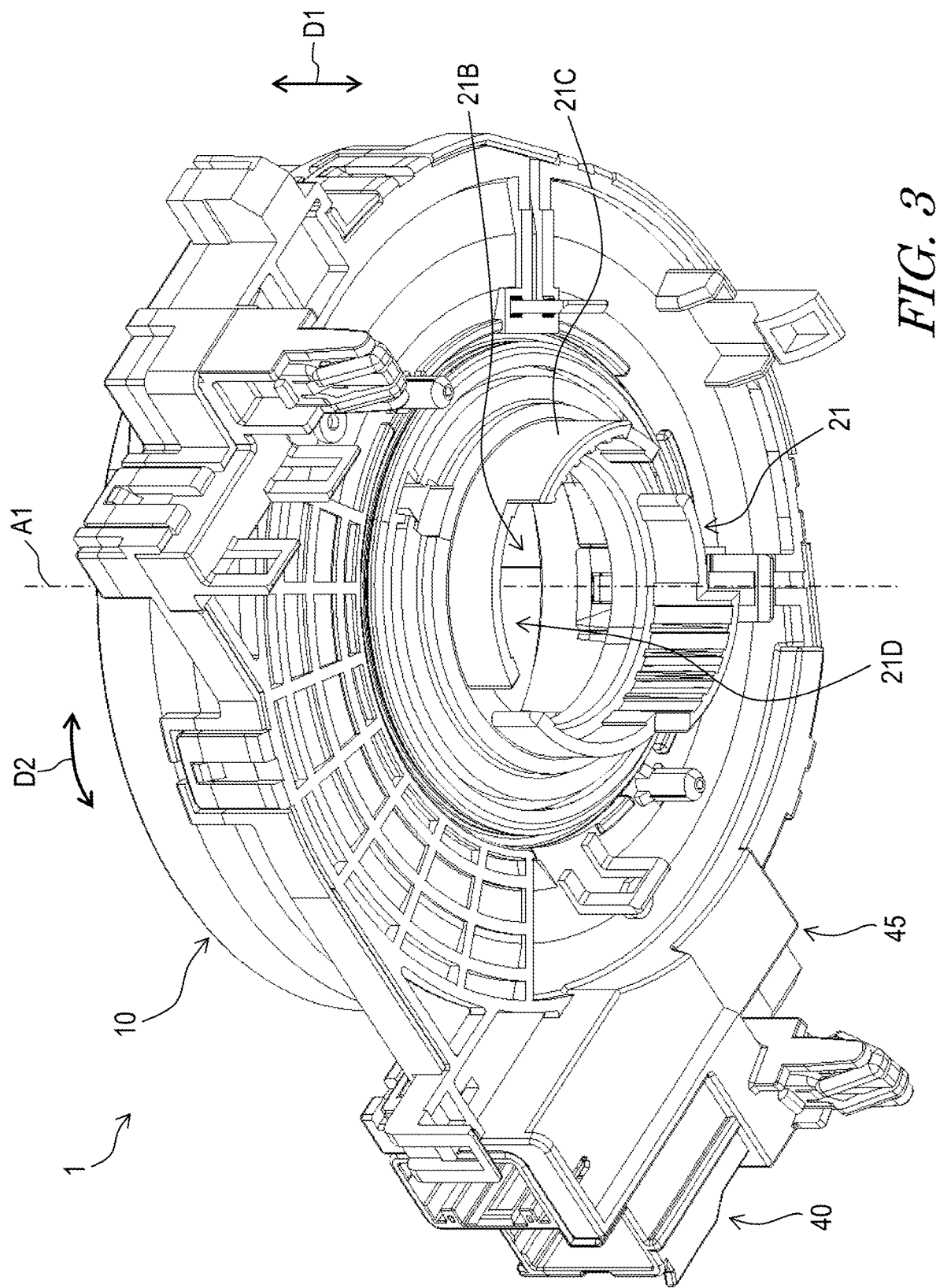
FIG. 3 is another perspective view of the rotary connector device illustrated in FIG. 1.

As illustrated in FIG. 3, the rotary connector device 1 includes a stator-side connector housing 40 and a housing cover 45. The stator-side connector housing 40 and the housing cover 45 are attached to the stator 10. The stator-side connector housing 40 houses a stator-side electrical connector that is connected to electrical devices (for example, a control device and a battery) provided in the vehicle body.

Figure 4:
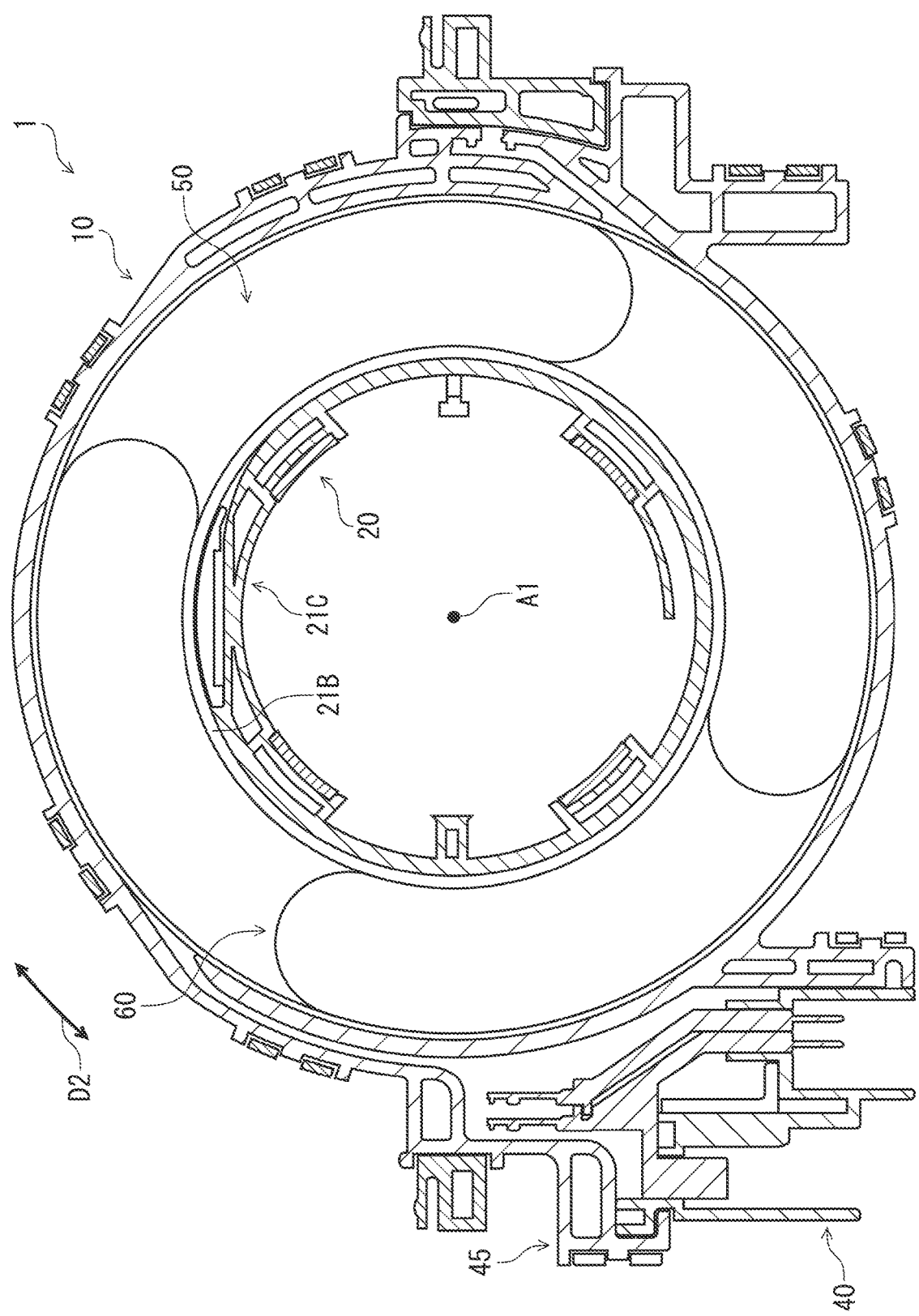
FIG. 4 is a cross-sectional view of the rotary connector device taken along line IV-IV of FIG. 1.

FIG. 4 is a cross-sectional view of the rotary connector device 1 taken along line IV-IV of FIG. 1. As illustrated in FIG. 4, the stator 10 and the rotor 20 define a cable housing space 50 between the stator 10 and the rotor 20, in which the cable housing space 50 is provided to surround the rotation axis A1. For example, the cable housing space 50 is annular and extends in a circumferential direction D2 relative to the rotation axis A1. The rotary connector device 1 includes an electrical cable 60. The electrical cable 60 is disposed in the cable housing space 50 and is electrically connected to the stator-side connector housing 40 (FIG. 2). The electrical cable 60 is flexible and has a flat shape. The electrical cable 60 is also referred to as a flexible flat cable.

Figure 5:
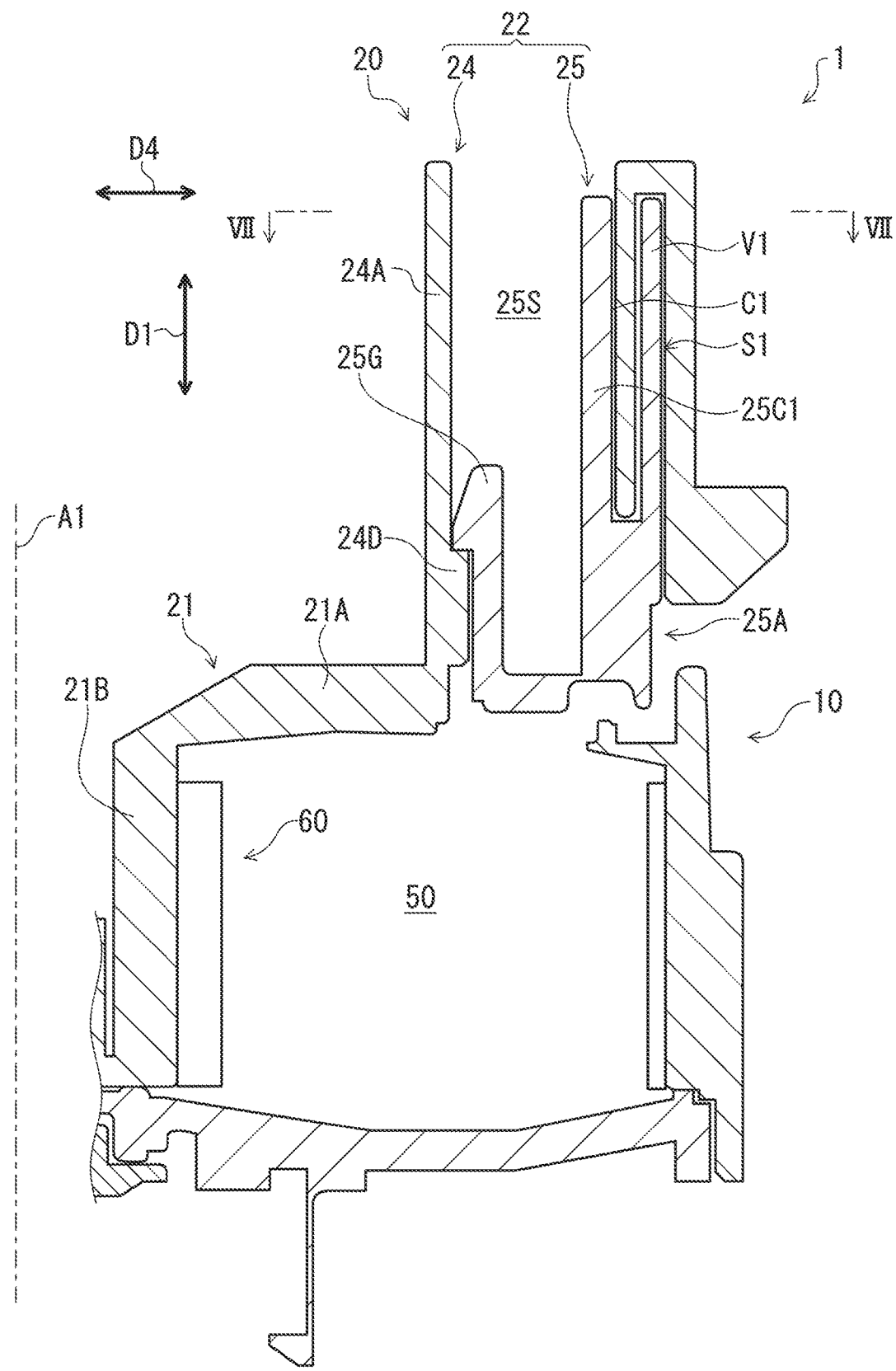
FIG. 5 is a partial cross-sectional view of the rotary connector device taken along line V-V of FIG. 7.

FIG. 5 is a cross-sectional view of the connector housing 22. As illustrated in FIG. 5, the first connector holder 24 extends from the rotor main body 21 away from the cable housing space 50 along the rotation axis A1. The first connector holder 24 extends from the rotor main body 21 along the axial direction D1 parallel to the rotation axis A1. In the present embodiment, the first connector holder 24 is integrally formed with the rotating plate 21A and the cylindrical portion 21B of the rotor main body 21 as one single member. However, the first connector holder 24 may be a separate member from the rotating plate 21A and the cylindrical portion 21B.

Figure 6:
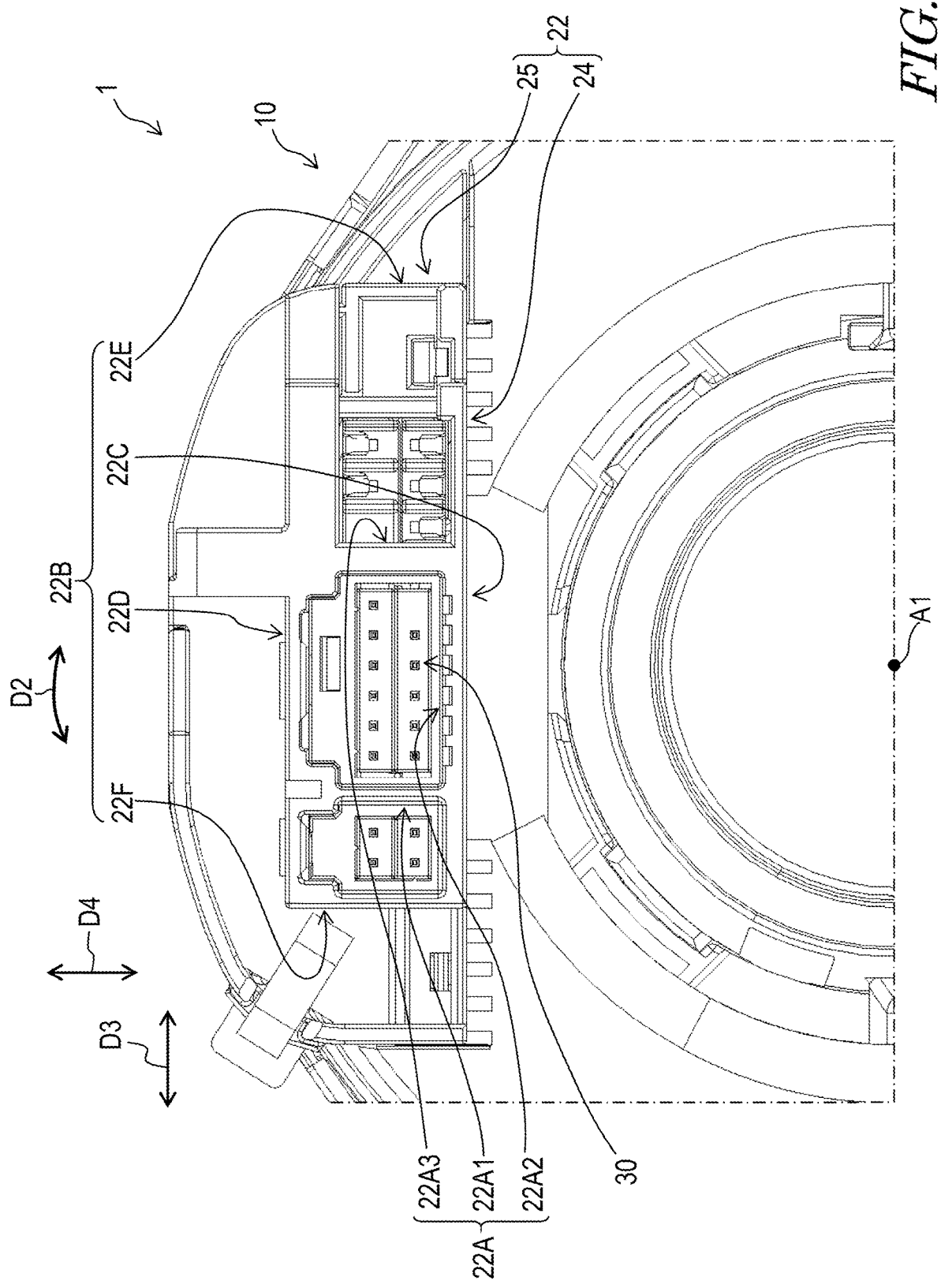
FIG. 6 is a partial top view of the rotary connector device illustrated in FIG. 1.

FIG. 6 is a top view of the connector housing 22. As illustrated in FIG. 6, the connector housing 22 includes a housing outer surface 22B. The housing outer surface 22B is disposed so as to surround the connector housing space 22A when viewed along the rotation axis A1. The housing outer surface 22B includes a first outer surface 22C, a second outer surface 22D, a third outer surface 22E, and a fourth outer surface 22F. The first outer surface 22C faces the rotation axis A1. The second outer surface 22D is disposed opposite to the first outer surface 22C relative to the connector housing space 22A so as to face radially outward. The third outer surface 22E is disposed between the first outer surface 22C and the second outer surface 22D so as to face in a direction different from the direction in which the first outer surface 22C faces. The fourth outer surface 22F is disposed opposite to the third outer surface 22E relative to the connector housing space 22A.

FIG. 7 is a cross-sectional view of the connector housing 22. As illustrated in FIG. 7, in the present embodiment, when viewed along the rotation axis A1, a length L3 of the third outer surface 22E is shorter than a length L2 of the second outer surface 22D. When viewed along the rotation axis A1, the length L3 of the third outer surface 22E is shorter than a length L1 of the first outer surface 22C. When viewed along the rotation axis A1, a length L4 of the fourth outer surface 22F is shorter than the length L2 of the second outer surface 22D. When viewed along the rotation axis A1, the length of the fourth outer surface 22F is shorter than the length of the first outer surface 22C. However, the relationship between the lengths L1 to L4 is not limited to the present embodiment.

The connector housing 22 has a longitudinal direction D3. When viewed along the axial direction D1, the connector housing 22 has an elongated cross-sectional shape in the longitudinal direction D3. The lengths L1 and L2 are defined along the longitudinal direction D3. The lengths L3 and L4 are defined in a direction D4 orthogonal to the axial direction D1 and the longitudinal direction D3. The direction D4 may also be referred to as a first direction D4. The longitudinal direction D3 may also be referred to as a second direction D3.

In the present embodiment, the second outer surface 22D is provided only on the first connector holder 24 among the first connector holder 24 and the second connector holder 25. The third outer surface 22E is provided on the first connector holder 24 and the second connector holder 25. The fourth outer surface 22F is provided only on the first connector holder 24 among the first connector holder 24 and the second connector holder 25. However, the fourth outer surface 22F may be provided on the first connector holder 24 and the second connector holder 25.

The connector housing 22 includes a first gap S1. The first gap S1 is provided between the first connector holder 24 and the second connector holder 25, and extends from the housing outer surface 22B toward the connector housing space 22A. The first gap S1 is exposed from the housing outer surface 22B. The first gap S1 extends from one of the third outer surface 22E and the fourth outer surface 22F toward the connector housing space 22A. In the present embodiment, the first gap S1 extends from the third outer surface 22E toward the connector housing space 22A. The first gap S1 is exposed from the third outer surface 22E. However, the first gap S1 may be exposed from the fourth outer surface 22F or may extend from the fourth outer surface 22F toward the connector housing space 22A.

One of the first connector holder 24 and the second connector holder 25 includes a first recess C1. The other of the first connector holder 24 and the second connector holder 25 includes a first protrusion V1 provided in the first recess C1. In the present embodiment, the first connector holder 24 includes the first recess C1, and the second connector holder 25 includes the first protrusion V1. However, the second connector holder 25 may include the first recess C1, and the first connector holder 24 may include the first protrusion V1. Further, the first recess C1 and the first protrusion V1 may be omitted from the connector housing 22.

The first gap S1 is provided at least partially between the first recess C1 and the first protrusion V1. The first recess C1 and the first protrusion V1 are disposed between the housing outer surface 22B and the connector housing space 22A. In the present embodiment, the first gap S1 is partially provided between the first recess C1 and the first protrusion V1. However, the first gap S1 may be entirely provided between the first recess C1 and the first protrusion V1.

The first connector holder 24 includes a first holder main body 24A. The first holder main body 24A includes the first recess C1, the connector housing space 22A, and a holder housing space 24B. The first recess C1 is connected to the holder housing space 24B. The second connector holder 25 is at least partially disposed in the holder housing space 24B.

As illustrated in FIG. 7, the connector housing 22 includes a second gap S2. The second gap S2 is provided between the first connector holder 24 and the second connector holder 25, and extends from the housing outer surface 22B toward the connector housing space 22A. The second gap S2 is exposed from the housing outer surface 22B. In the present embodiment, the second gap S2 extends from the first outer surface 22C toward the connector housing space 22A. The second gap S2 is exposed from the first outer surface 22C. However, the second gap S2 may be exposed from one of the second outer surface 22D, the third outer surface 22E, and the fourth outer surface 22F, and may extend from one of the second outer surface 22D, the third outer surface 22E, and the fourth outer surface 22F toward the connector housing space 22A. Further, the second gap S2 may be omitted from the connector housing 22.

One of the first connector holder 24 and the second connector holder 25 includes a second recess C2. The other of the first connector holder 24 and the second connector holder 25 includes a second protrusion V2 provided in the second recess C2. In the present embodiment, the first connector holder 24 includes the second recess C2, and the second connector holder 25 includes the second protrusion V2. However, the second connector holder 25 may include the second recess C2 and the first connector holder 24 may include the second protrusion V2. In addition, the second recess C2 and the second protrusion V2 may be omitted from the connector housing 22.

The second gap S2 is provided at least partially between the second recess C2 and the second protrusion V2. The second recess C2 and the second protrusion V2 are disposed between the housing outer surface 22B and the connector housing space 22A. In the present embodiment, the second gap S2 is entirely provided between the second recess C2 and the second protrusion V2. However, the second gap S2 may be partially provided between the second recess C2 and the second protrusion V2.

The first holder main body 24A includes the second recess C2. The second recess C2 is disposed on the first outer surface 22C. The second protrusion V2 protrudes from a fourth wall 25F toward a first wall 25B.

The connector housing 22 includes a third gap S3. The third gap S3 is provided between the first connector holder 24 and the second connector holder 25. In the present embodiment, the third gap S3 is not exposed from the housing outer surface 22B, and is provided inside the housing outer surface 22B. However, the third gap S3 may be exposed from the housing outer surface 22B or may extend from the housing outer surface 22B to the connector housing space 22A.

One of the first connector holder 24 and the second connector holder 25 includes a third recess C3. The other of the first connector holder 24 and the second connector holder 25 includes a third protrusion V3 provided in the third recess C3. In the present embodiment, the first connector holder 24 includes the third recess C3, and the second connector holder 25 includes the third protrusion V3. The first wall 25B of the second connector holder 25 includes the third protrusion V3. However, the second connector holder 25 may include the third recess C3, and the first connector holder 24 may include the third protrusion V3. In addition, the third recess C3 and the third protrusion V3 may be omitted from the connector housing 22.

The third gap S3 is provided at least partially between the third recess C3 and the third protrusion V3. The third recess C3 and the third protrusion V3 are disposed between the housing outer surface 22B and the connector housing space 22A. In the present embodiment, the third gap S3 is entirely provided between the third recess C3 and the third protrusion V3. However, the third gap S3 may be partially provided between the third recess C3 and the third protrusion V3.

The first holder main body 24A includes the third recess C3. The third recess C3 is connected to the holder housing space 24B. In the present embodiment, the third recess C3 is disposed between the second recess C2 and the connector housing space 22A. The third protrusion V3 is disposed between the second protrusion V2 and the connector housing space 22A. However, the arrangement of the third recess C3 and the third protrusion V3 is not limited to the present embodiment.

One of the first connector holder 24 and the second connector holder 25 includes a fourth recess C4. The other of the first connector holder 24 and the second connector holder 25 includes a fourth protrusion V4 provided in the fourth recess C4. In the present embodiment, the first connector holder 24 includes the fourth recess C4, and the second connector holder 25 includes the fourth protrusion V4. The first wall 25B of the second connector holder 25 includes a fourth protrusion V4. However, the second connector holder 25 may include the fourth recess C4, and the first connector holder 24 may include the fourth protrusion V4. Further, the fourth recess C4 and the fourth protrusion V4 may be omitted from the connector housing 22.

The first gap S1 is provided at least partially between the fourth recess C4 and the fourth protrusion V4. The fourth recess C4 and the fourth protrusion V4 are disposed between the housing outer surface 22B and the connector housing space 22A. In the present embodiment, the first gap S1 is partially provided between the fourth recess C4 and the fourth protrusion V4. However, the first gap S1 may be entirely provided between the fourth recess C4 and the fourth protrusion V4.

The fourth recess C4 is disposed between the first recess C1 and the connector housing space 22A. The fourth protrusion V4 is disposed between the first protrusion V1 and the connector housing space 22A. However, the arrangement of the fourth recess C4 and the fourth protrusion V4 is not limited to the present embodiment.

Figure 8:
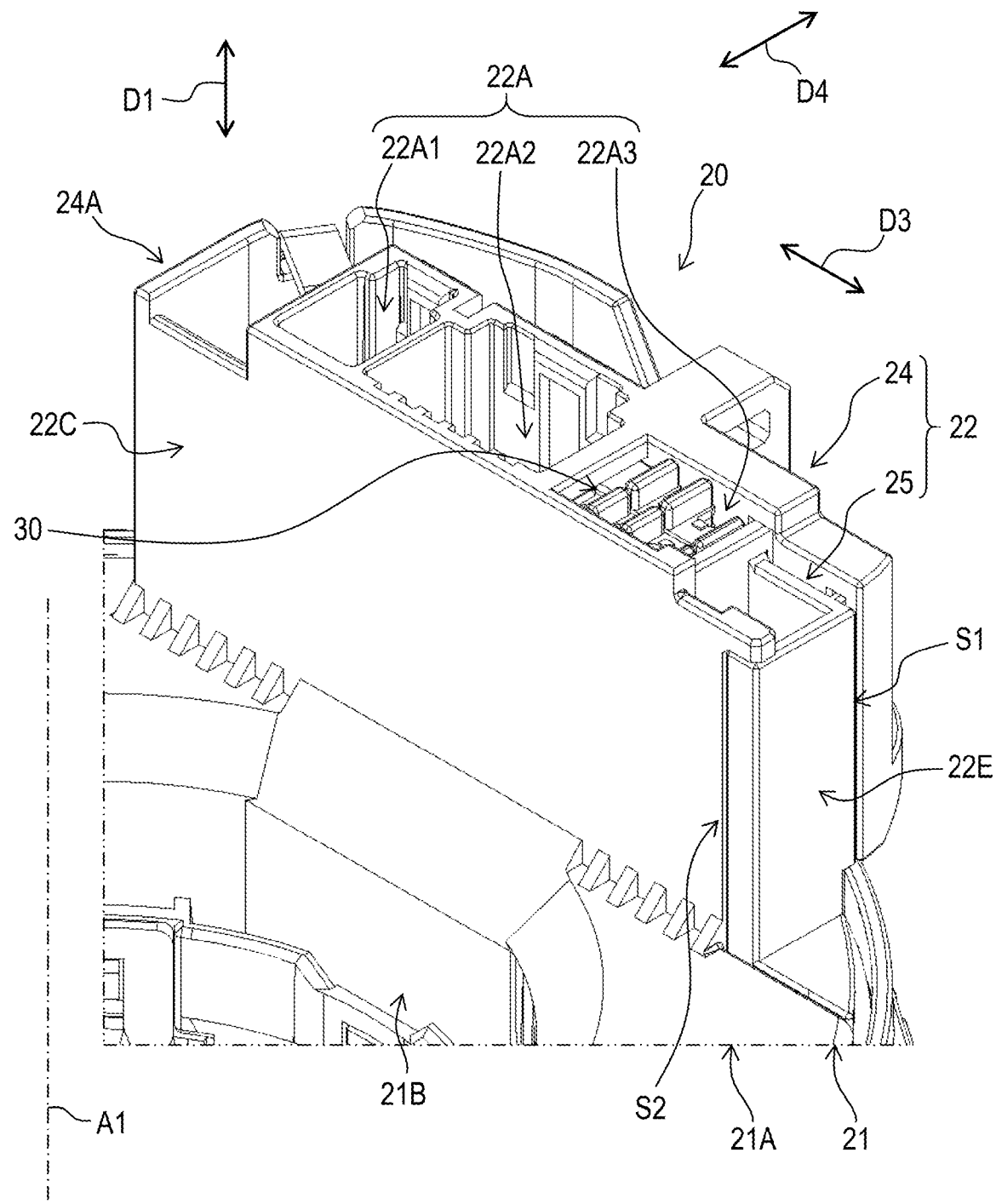
FIG. 8 is a partial perspective view of the rotary connector device illustrated in FIG. 1.

FIG. 8 is a perspective view of the connector housing 22. As illustrated in FIG. 8, the first gap S1 extends along the rotation axis A1. In the present embodiment, the first gap S1 extends along the axial direction D1 in the third outer surface 22E. The second gap S2 extends along the rotation axis A1. In the present embodiment, the second gap S2 extends in the first outer surface 22C along the rotation axis A1 (along the axial direction D1).

Figure 9:
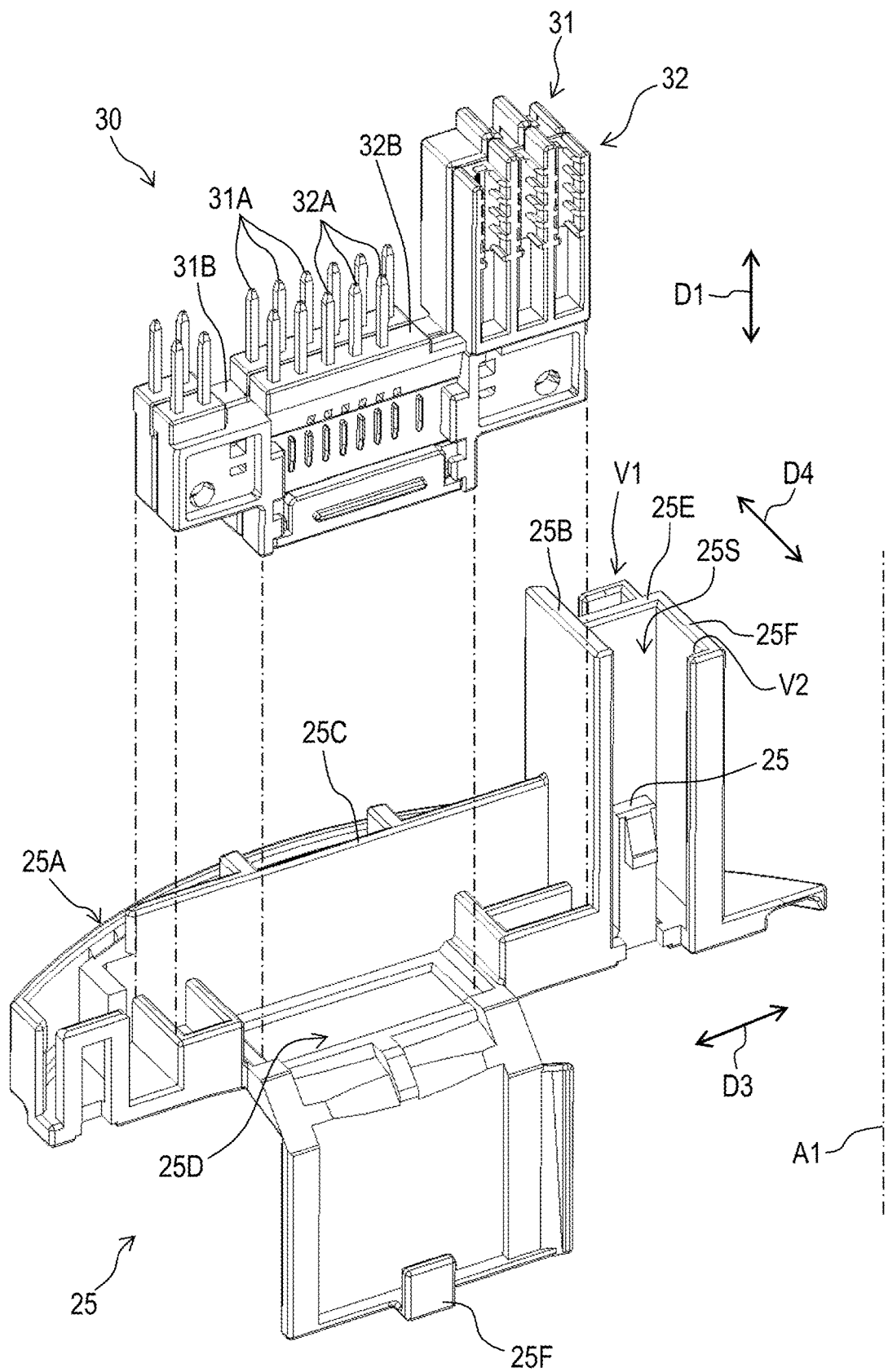
FIG. 9 is an exploded perspective view of an electrical connector and a second connector holder of the rotary connector device illustrated in FIG. 1.

FIG. 9 is an exploded perspective view of the second connector holder 25 and the electrical connector 30. As illustrated in FIG. 9, the electrical connector 30 includes a first connector 31 and a second connector 32. The first connector 31 includes a plurality of bus bars 31A and a bus bar case 31B. For example, the plurality of bus bars 31A are made of metals, and the bus bar case 31B is made of resins. The plurality of bus bars 31A protrude from the bus bar case 31B along the axial direction D1. The bus bar case 31B holds the plurality of bus bars 31A. The second connector 32 includes a plurality of bus bars 32A and a bus bar case 32B. For example, the plurality of bus bars 32A are made of metals, and the bus bar case 32B is made of resins. The plurality of bus bars 32A protrude from the bus bar case 32B along the axial direction D1. The bus bar case 32B holds the plurality of bus bars 32A. The plurality of bus bars 31A and 31B are electrically connected to the electrical cable 60 (see FIG. 4).

The second connector holder 25 includes a second holder main body 25A, the first wall 25B, and a second wall 25C. The second holder main body 25A includes a connector support portion 25D that supports the electrical connector 30. The electrical connector 30 is disposed on the connector support portion 25D. The first wall 25B extends from the second holder main body 25A along the axial direction D1 parallel to the rotation axis A1. The second wall 25C extends from the second holder main body 25A along the axial direction D1 and is coupled to the first wall 25B. The first wall 25B extends in the first direction D4 orthogonal to the axial direction D1.

Figure 10:
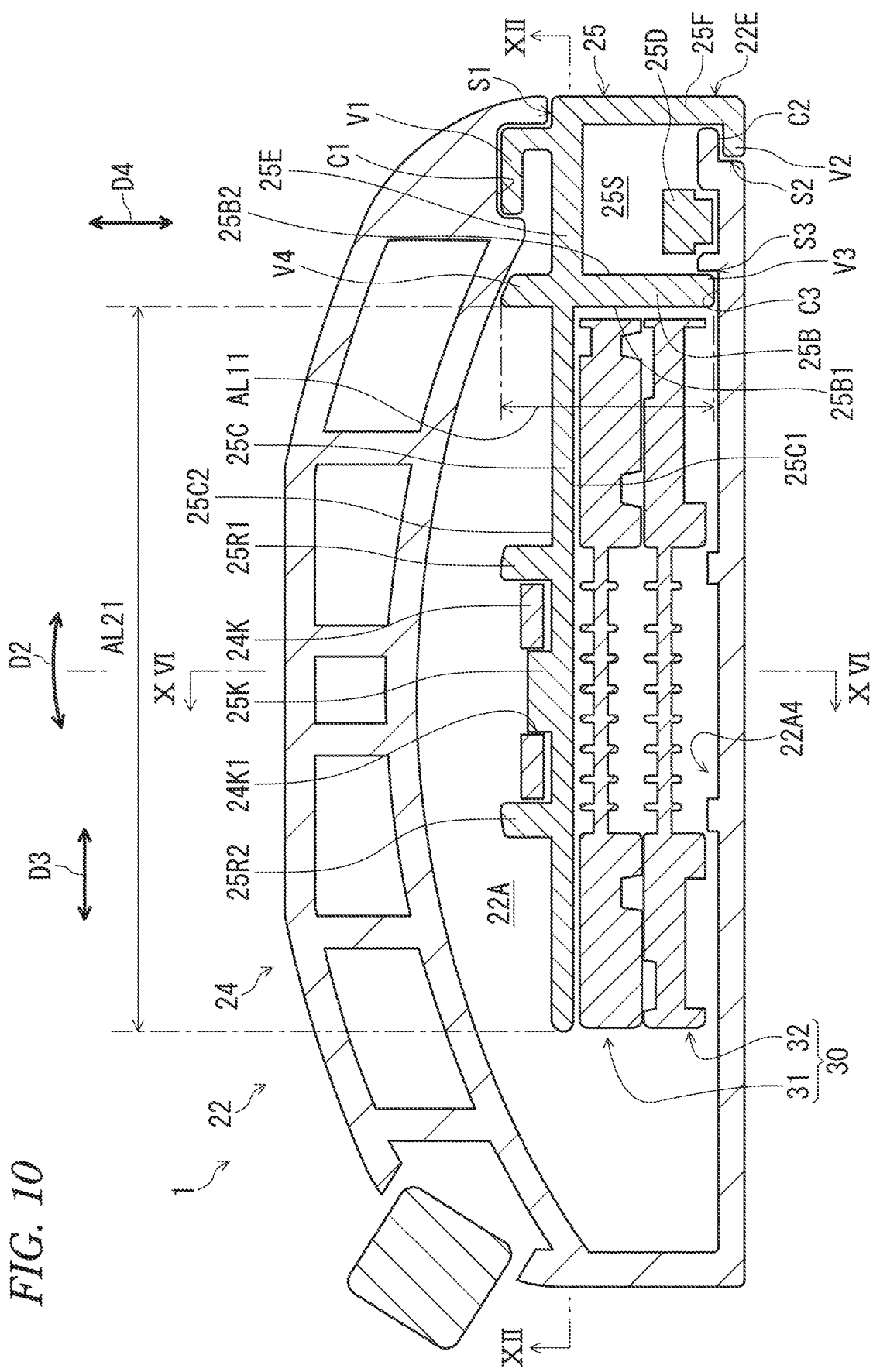
FIG. 10 is a cross-sectional view of the rotary connector device taken along line X-X of FIG. 16.

FIG. 10 is a cross-sectional view of the connector housing 22. As illustrated in FIG. 10, the first wall 25B is disposed between the connector housing space 22A and the first gap S1. The second wall 25C is disposed opposite to the first gap S1 relative to the first wall 25B. The second wall 25C extends from the first wall 25B in the second direction D3 that is orthogonal to the axial direction D1 and different from the first direction D4. The second wall 25C extends from the first wall 25B opposite to the first gap S1, and is disposed in the connector housing space 22A.

The first wall 25B includes a first wall surface 25B1 facing the electrical connector 30. The first wall 25B includes a third wall surface 25B2 provided on the back side of the first wall surface 25B1. The first wall surface 25B1 and the third wall surface 25B2 face the second direction D3. The second wall 25C extends from the first wall surface 25B1 in the second direction D3. The second wall 25C includes a second wall surface 25C1 and a fourth wall surface 25C2. The second wall surface 25C1 faces the electrical connector 30. The fourth wall surface 25C2 is provided on the back side of the second wall surface 25C1. The second wall surface 25C1 and the fourth wall surface 25C2 face the first direction D4. In the present embodiment, the second direction D3 is orthogonal to the first direction D4. However, the second direction D3 may or may not be substantially orthogonal to the first direction D4.

The first wall 25B has a first length AL11 defined in the first direction D4. The second wall 25C has a second length AL21 defined in the second direction D3. In the present embodiment, the second length AL21 is greater than the first length AL11. However, the second length AL21 may be less than or equal to the first length AL11.

The second connector holder 25 includes a first rib 25R1 and a second rib 25R2. The first rib 25R1 extends from the second wall 25C toward opposite to the electrical connector 30. The second rib 25R2 extends from the second wall 25C toward opposite to the electrical connector 30, and is spaced apart from the first rib 25R1 in the second direction D3. In the present embodiment, the first rib 25R1 and the second rib 25R2 protrude from the fourth wall surface 25C2 of the second wall 25C in the first direction D4. However, at least one of the first rib 25R1 and the second rib 25R2 may be omitted from the second connector holder 25.

Figure 11:
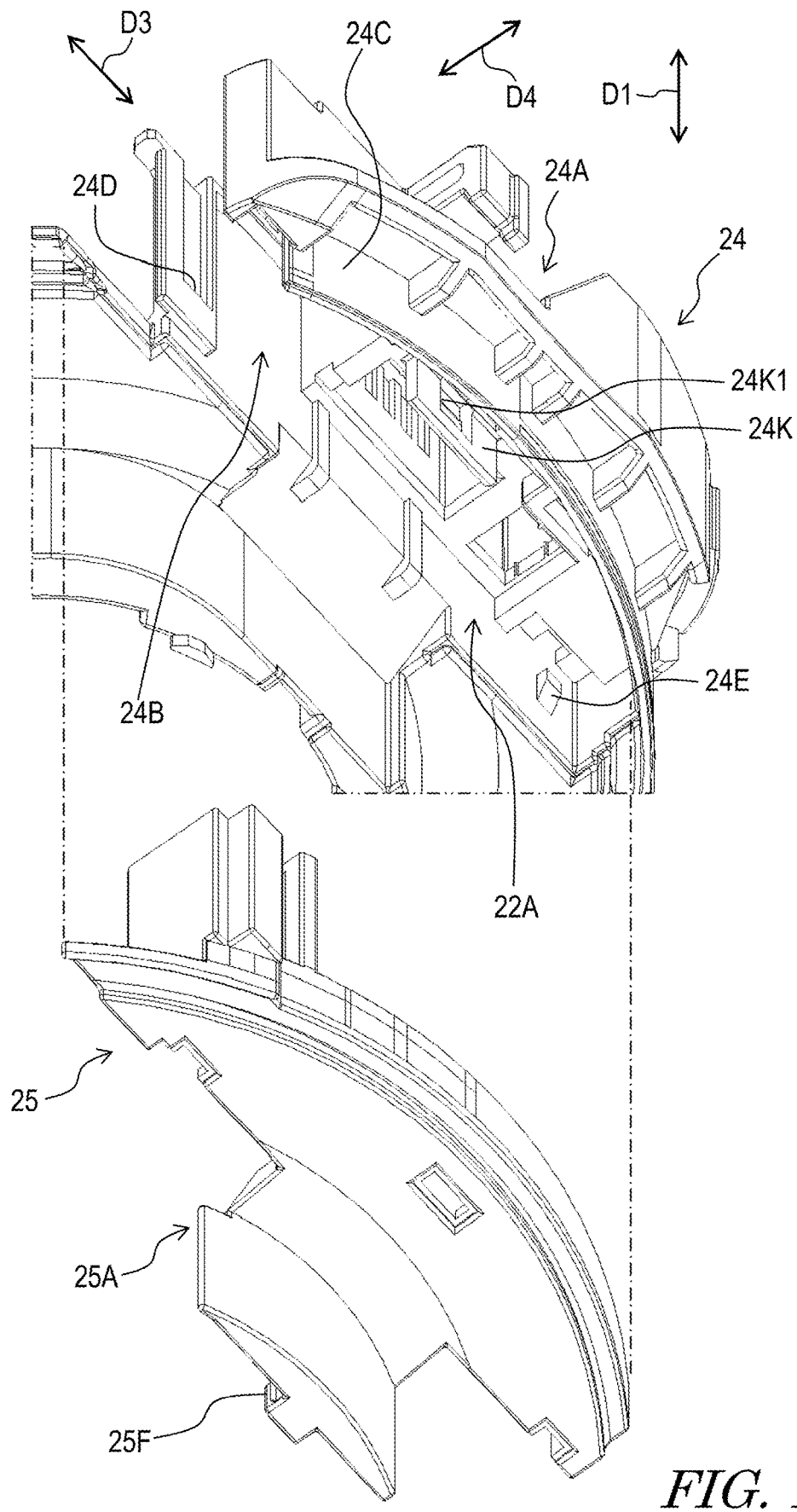
FIG. 11 is an exploded perspective view of a first connector holder and a second connector holder of the rotary connector device illustrated in FIG. 1.

As illustrated in FIG. 11, the first connector holder 24 includes a holder coupling portion 24K that couples the first connector holder 24 to the second wall 25C. The holder coupling portion 24K protrudes from the first holder main body 24A toward the second holder main body 25A along the axial direction D1. The holder coupling portion 24K includes a coupling groove 24K1.

As illustrated in FIG. 10, the second connector holder 25 includes a coupling protrusion 25K provided on the second wall 25C. The holder coupling portion 24K is hooked to the coupling protrusion 25K so as to couple the first connector holder 24 to the second connector holder 25. The coupling protrusion 25K is disposed between the first rib 25R1 and the second rib 25R2 in the second direction D3. In the present embodiment, the coupling protrusion 25K is provided on the fourth wall surface 25C2. The coupling protrusion 25K protrudes from the fourth wall surface 25C2 in the first direction D4. The coupling protrusion 25K is disposed in the coupling groove 24K1 of the holder coupling portion 24K.

Figure 12:
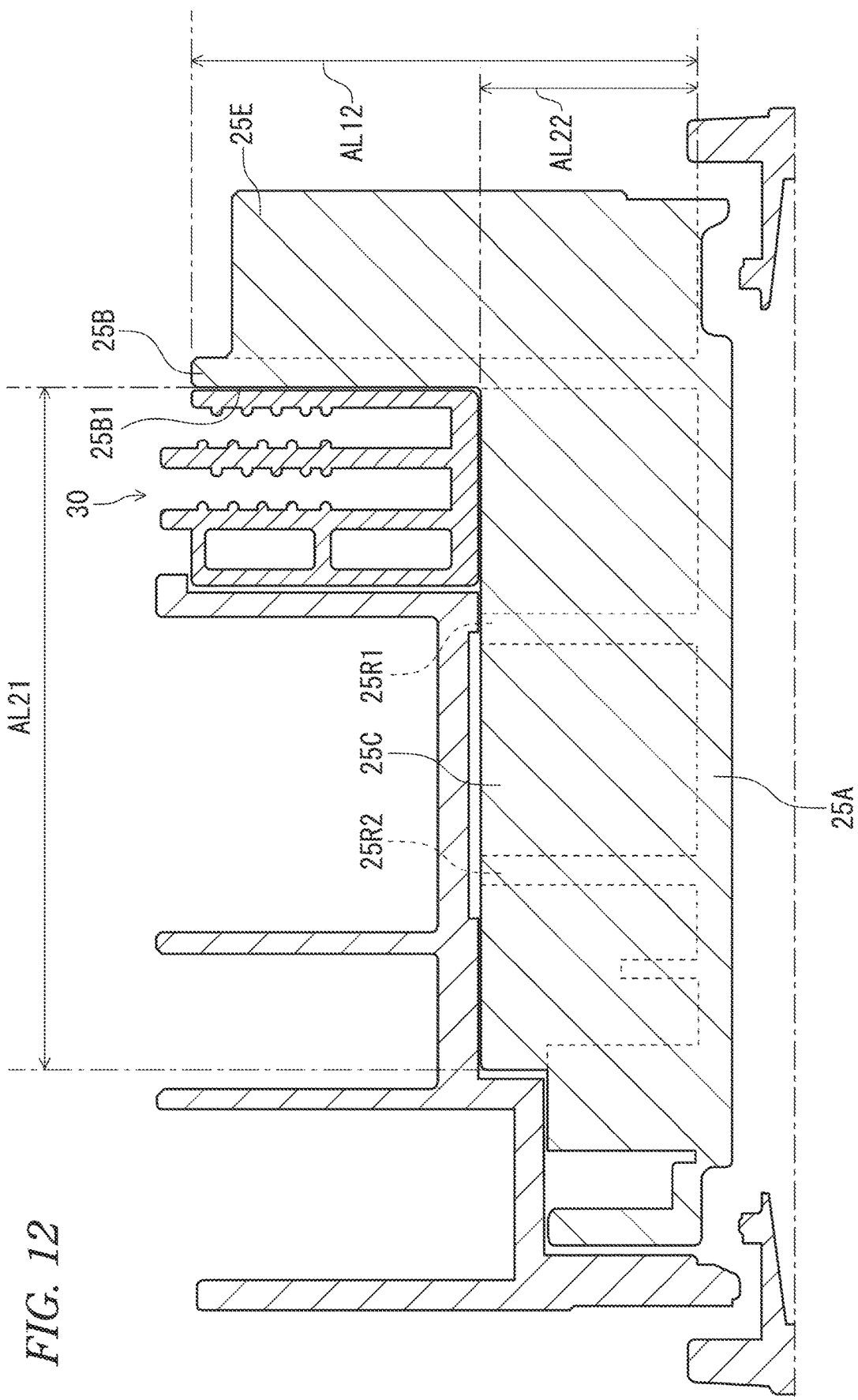
FIG. 12 is a cross-sectional view of the rotary connector device taken along line XII-XII of FIG. 10.

FIG. 12 is a cross-sectional view of the connector housing 22. As illustrated in FIG. 12, the first wall 25B has a first axial length AL12 defined from the second holder main body 25A in the axial direction D1. The second wall 25C has a second axial length AL22 defined from the second holder main body 25A in the axial direction D1. In the present embodiment, the second axial length AL22 is shorter than the first axial length AL12. The second length AL21 is longer than the second axial length AL22. However, the second axial length AL22 can also be equal to or longer than the first axial length AL12. The second length AL21 may be equal to or shorter than the second axial length AL22.

Figure 13:
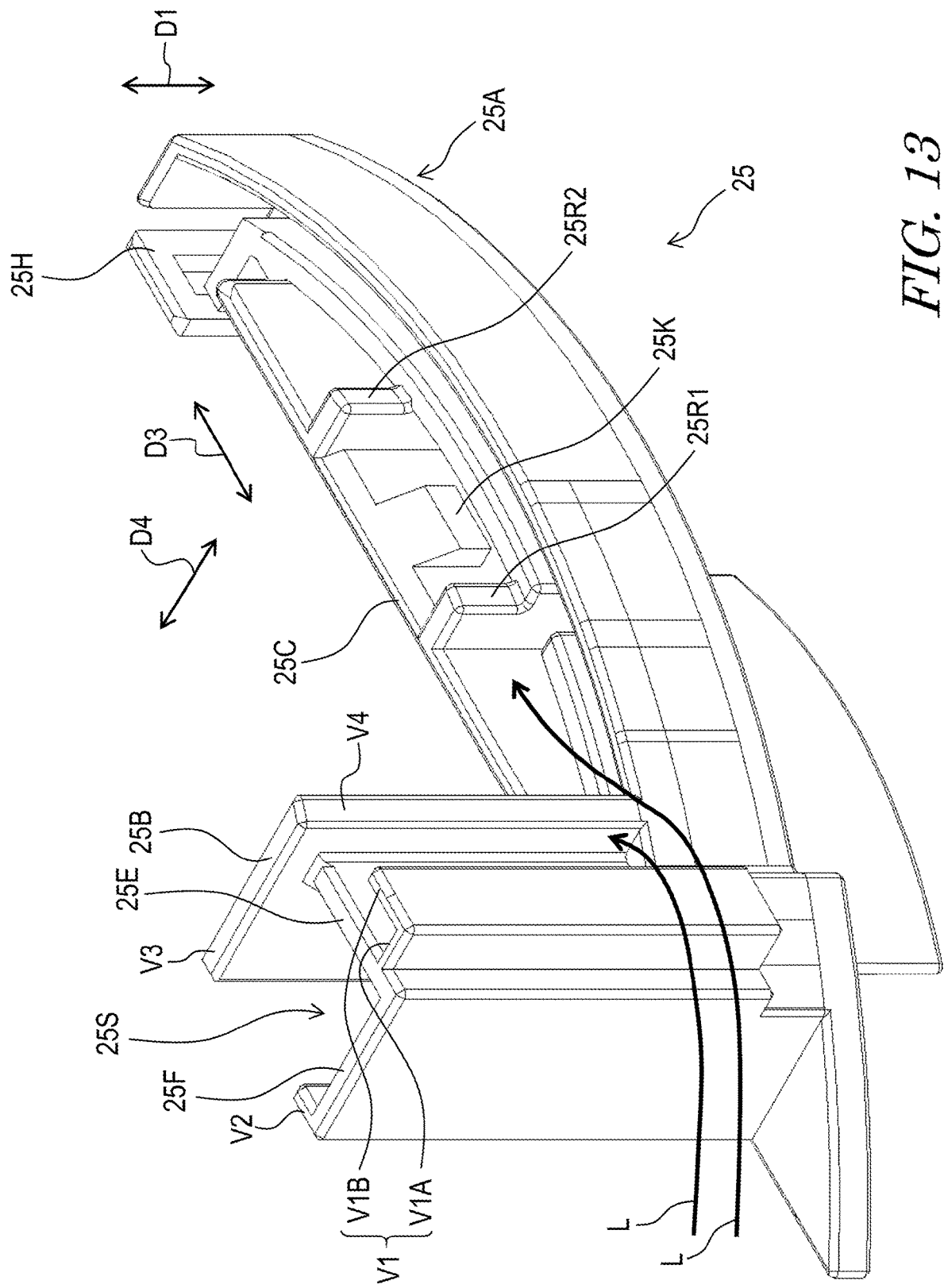
FIG. 13 is a perspective view of the second connector holder of the rotary connector device illustrated in FIG. 1.

FIG. 13 is a perspective view of the second connector holder 25. As illustrated in FIG. 13, the second connector holder 25 includes a third wall 25E and the fourth wall 25F. The fourth wall 25F is spaced apart from the first wall 25B in the second direction D3. The third wall 25E extends from the fourth wall 25F to the first wall 25B in the second direction D3 and couples the fourth wall 25F to the first wall 25B. The third wall 25E extends from the first wall 25B toward opposite to the second wall 25C in the second direction D3. The first protrusion V1 protrudes from the third wall 25E.

The first protrusion V1 includes a first base V1A and a first extension V1B. The first base V1A protrudes from the third wall 25E along the first direction D4. The first extension V1B is spaced apart from the third wall 25E in the first direction D4. The first extension V1B extends from the tip of the first base V1A along the third wall 25E (along the longitudinal direction D3). The first extension V1B extends from the tip of the first base V1A toward the fourth protrusion V4. The first protrusion V1 extends along the axial direction D1. The fourth protrusion V4 extends along the axial direction D1. As illustrated in FIG. 7, the first extension V1B extends from the first base VIA toward the connector housing space 22A.

Figure 14:
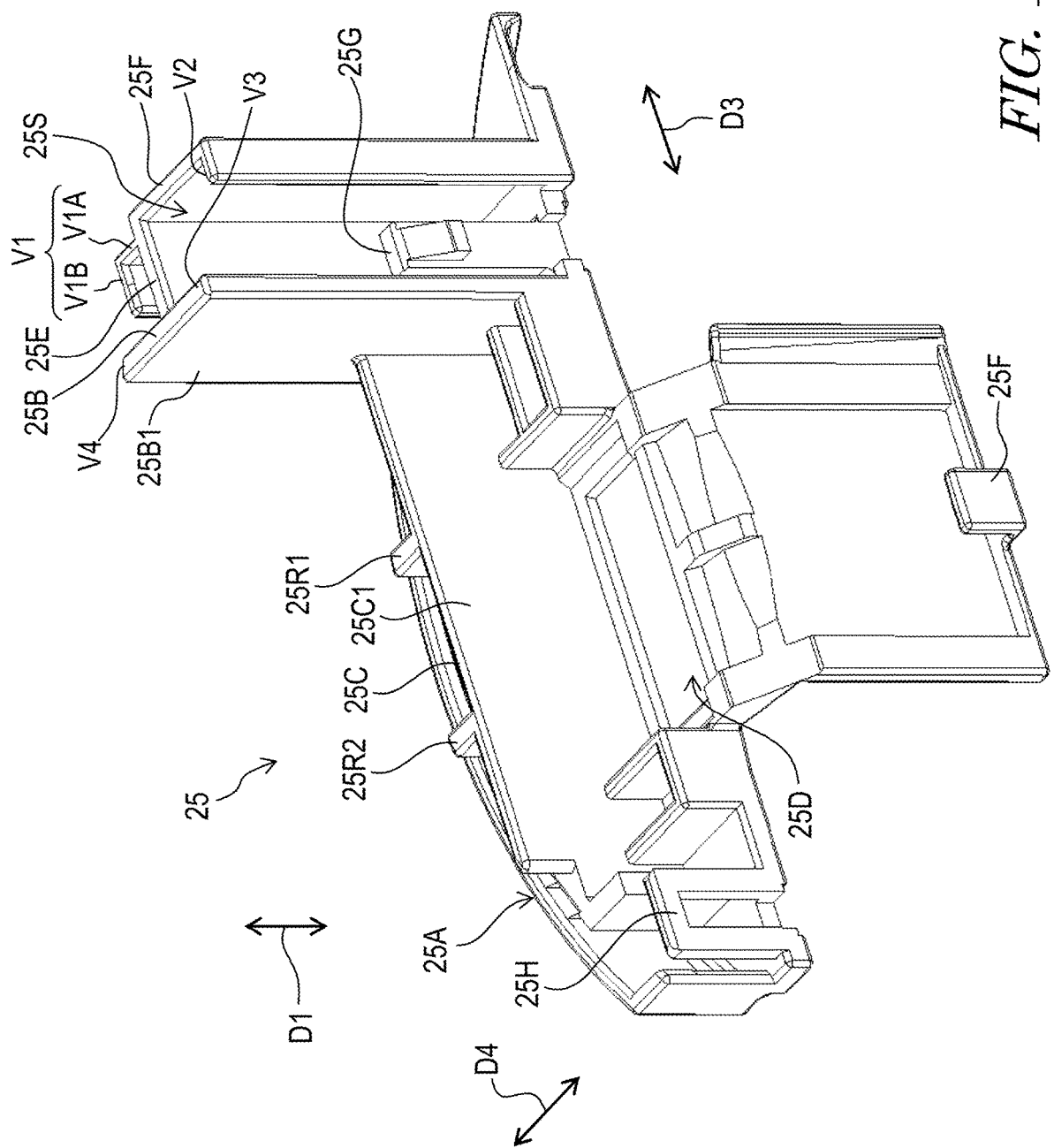
FIG. 14 is another perspective view of the second connector holder of the rotary connector device illustrated in FIG. 1.

FIG. 14 is a perspective view of the second connector holder 25. As illustrated in FIG. 14, the first wall 25B, the third wall 25E, and the fourth wall 25F define an internal space 25S. The second connector holder 25 includes a first holder coupling portion 25G, a second holder coupling portion 25H, and a third holder coupling portion 25J. The first holder coupling portion 25G is disposed in the internal space 25S. The second holder coupling portion 25H extends from the second holder main body 25A along the axial direction D1. The third holder coupling portion 25J extends from the second holder main body 25A along the axial direction D1.

As illustrated in FIG. 11, when the second connector holder 25 is assembled to the first connector holder 24, the second connector holder 25 is inserted into the connector housing space 22A of the first connector holder 24 in the axial direction D1. The first connector holder 24 includes a first coupling protrusion 24D and a second coupling protrusion 24E. As illustrated in FIG. 5, the first coupling protrusion 24D protrudes from the first holder main body 24A. The first holder coupling portion 25G is hooked to the first coupling protrusion 24D.

Figure 15:
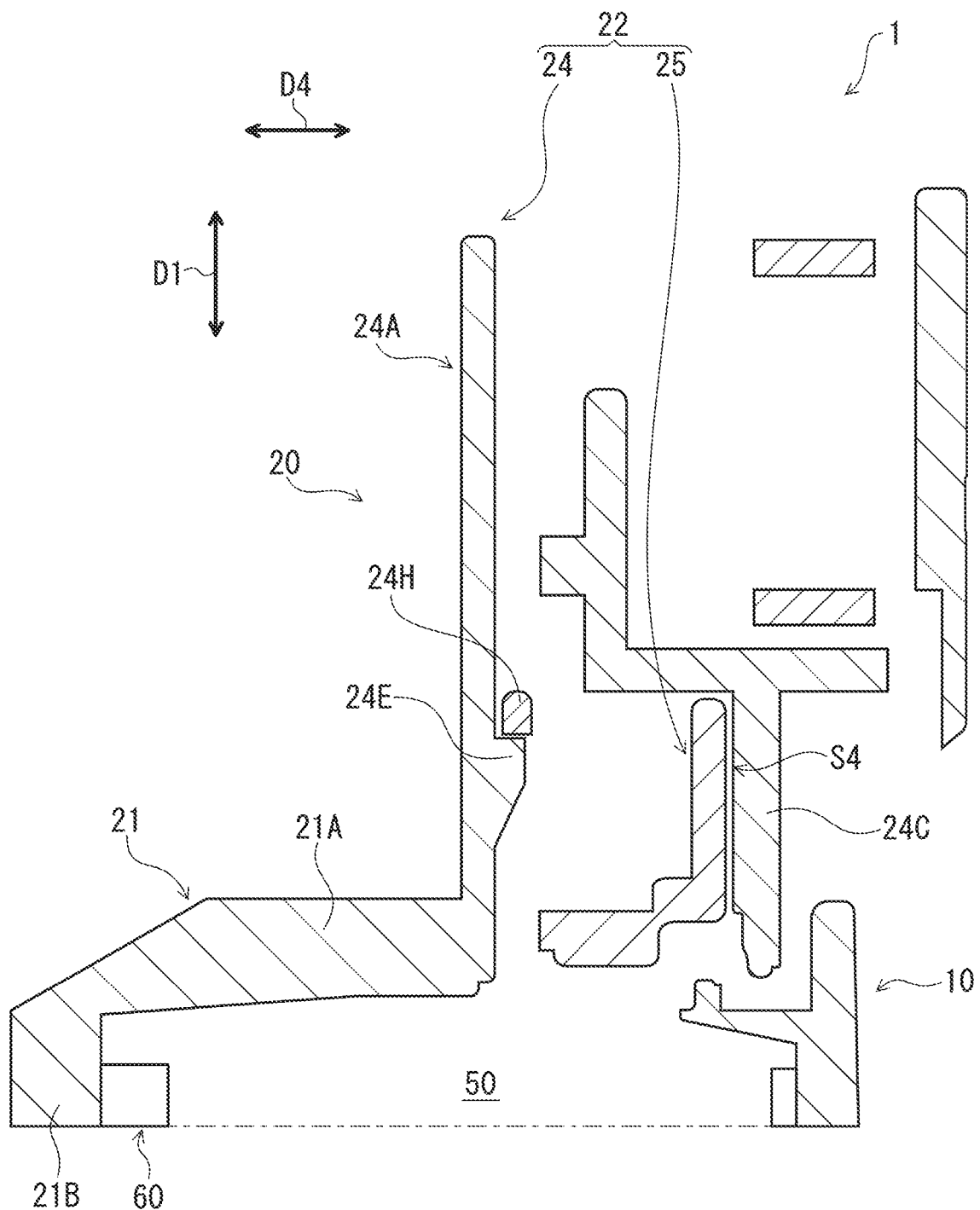
FIG. 15 is a partial cross-sectional view of the rotary connector device taken along line XV-XV of FIG. 7.
Figure 16:
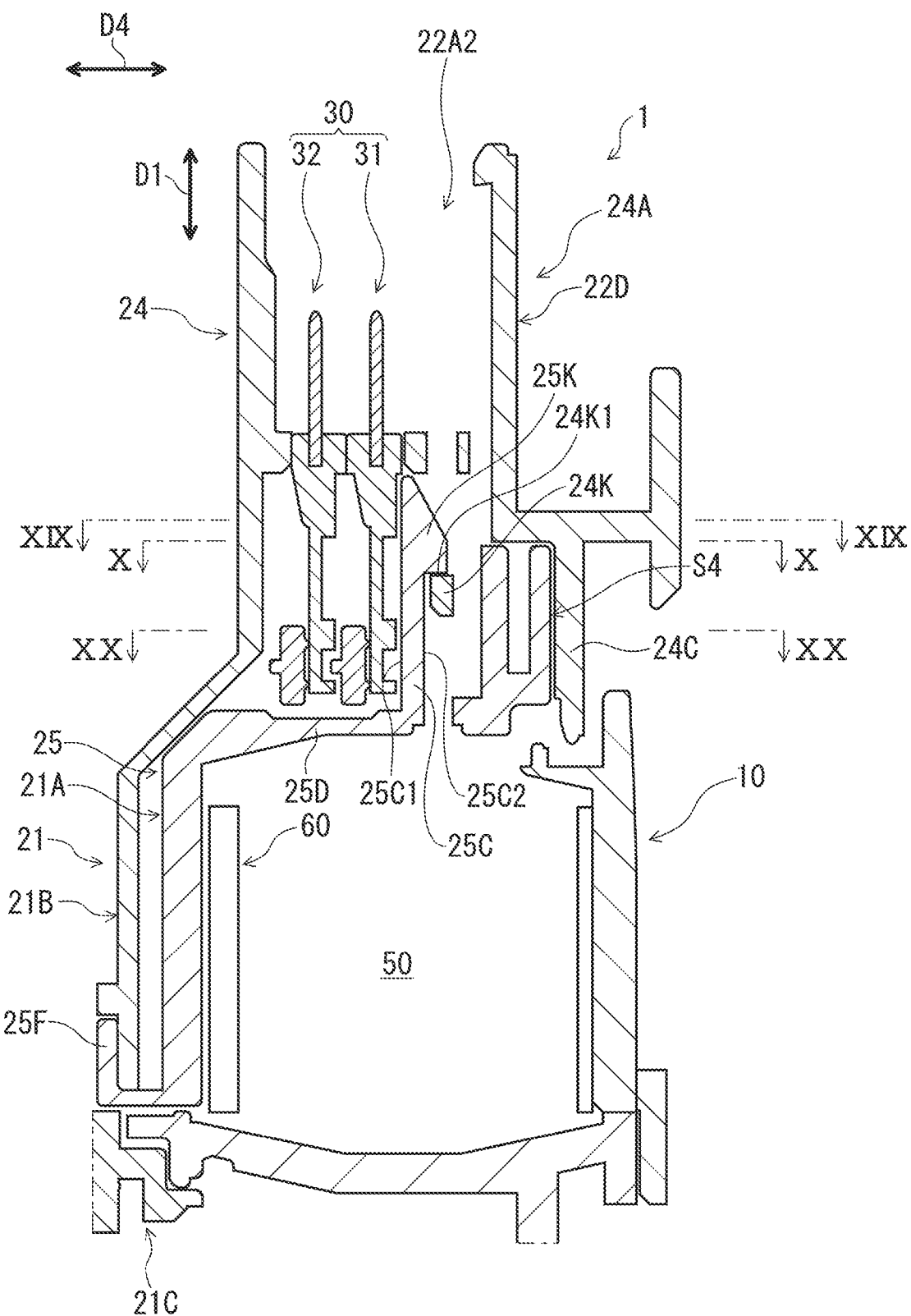
FIG. 16 is a partial cross-sectional view of the rotary connector device taken along line XVI-XVI of FIG. 10.

FIGS. 15 and 16 are cross-sectional views of the connector housing 22. As illustrated in FIG. 15, the second coupling protrusion 24E protrudes from the first holder main body 24A. The second holder coupling portion 25H is hooked to the second coupling protrusion 24E. As illustrated in FIG. 16, the third holder coupling portion 25J is hooked to the cylindrical portion 21B of the rotor main body 21. Thus, the second connector holder 25 is attached to the first connector holder 24.

Figure 17:
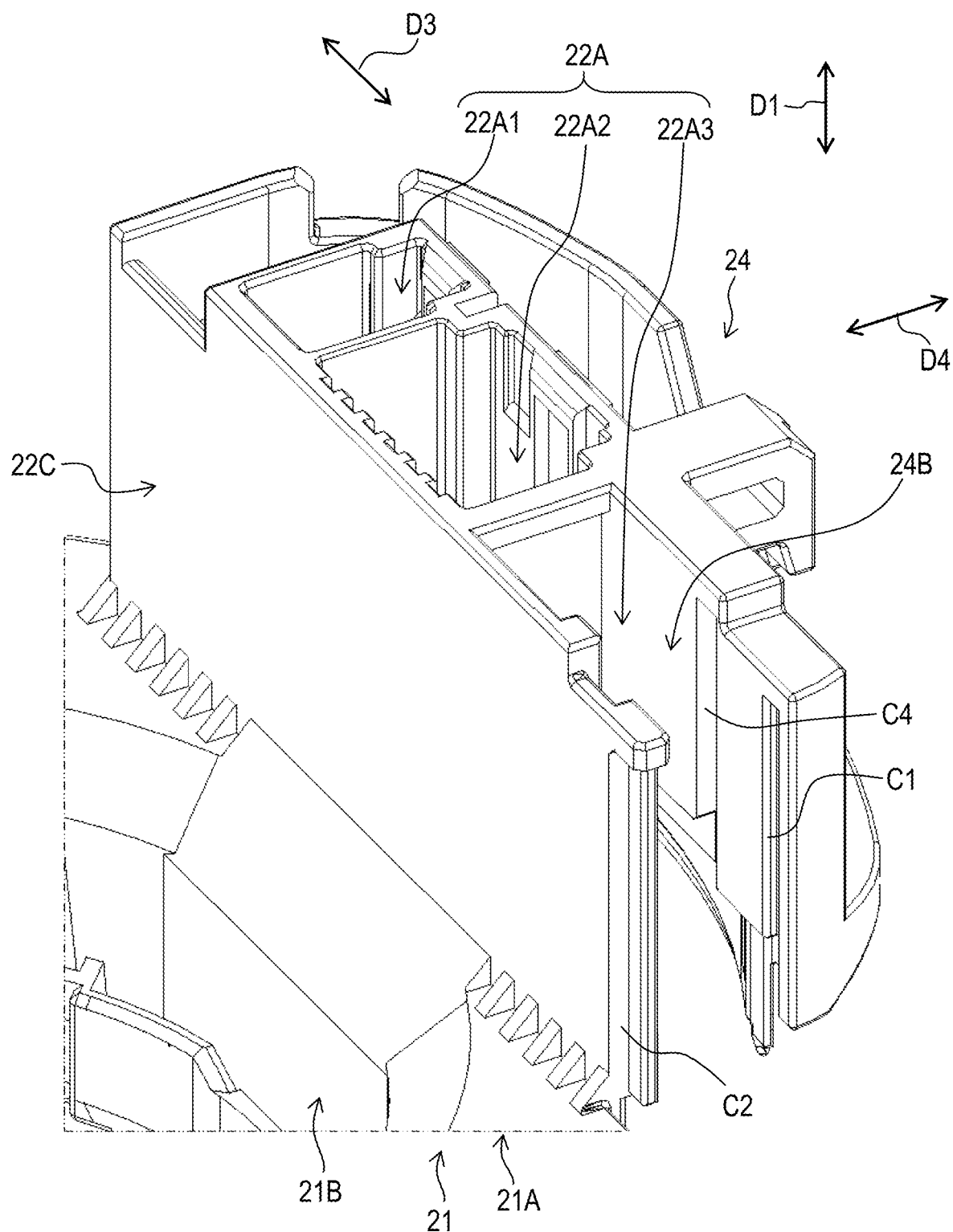
FIG. 17 is a perspective view of a first connector holder of the rotary connector device illustrated in FIG. 1.
Figure 18:
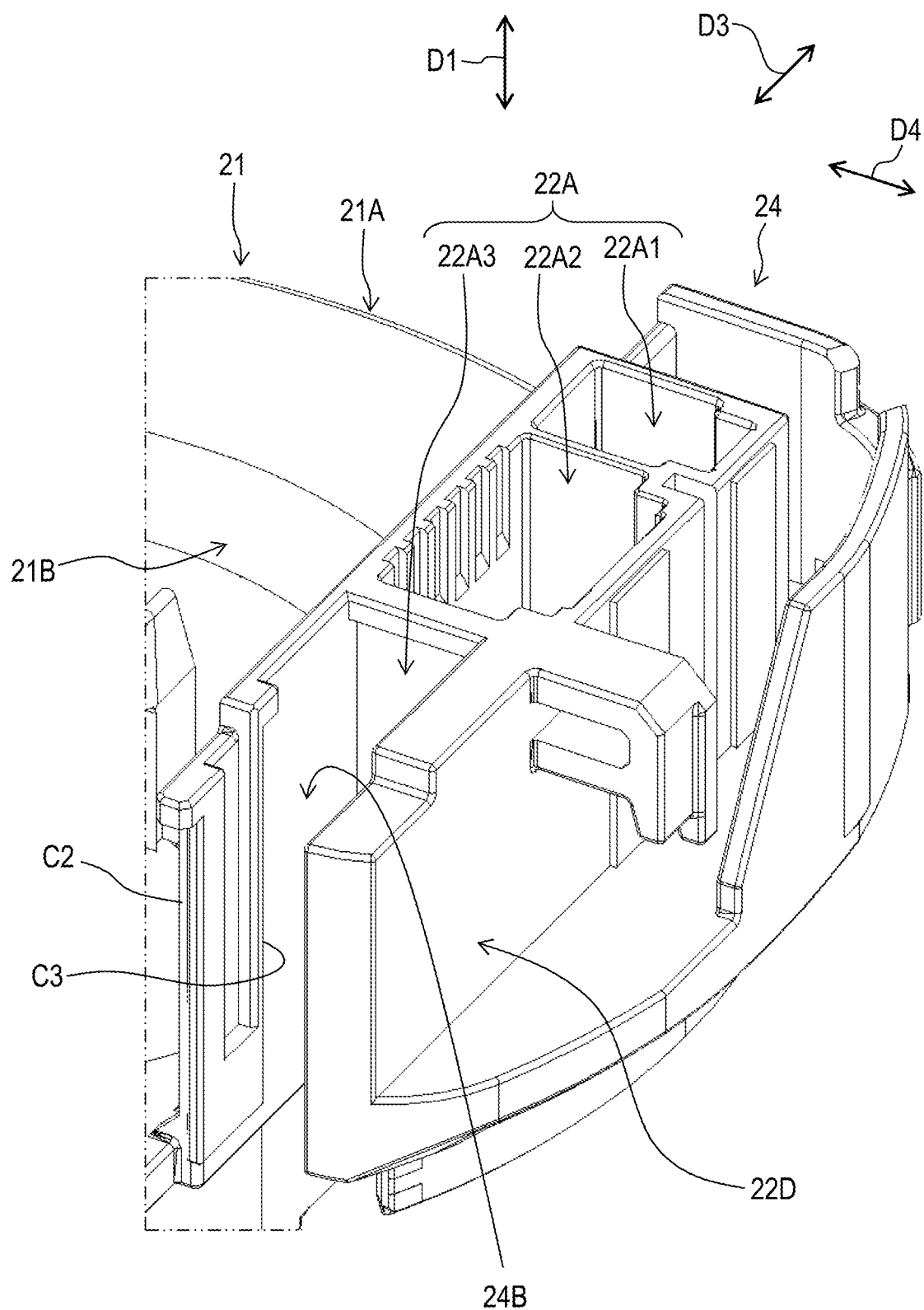
FIG. 18 is another perspective view of the first connector holder of the rotary connector device illustrated in FIG. 1.

FIGS. 17 and 18 are perspective views of the first connector holder 24. As illustrated in FIG. 17, the first recess C1, the second recess C2, and the fourth recess C4 extend along the axial direction D1. As illustrated in FIG. 18, the third recess C3 extends along the axial direction D1.

Figure 19:
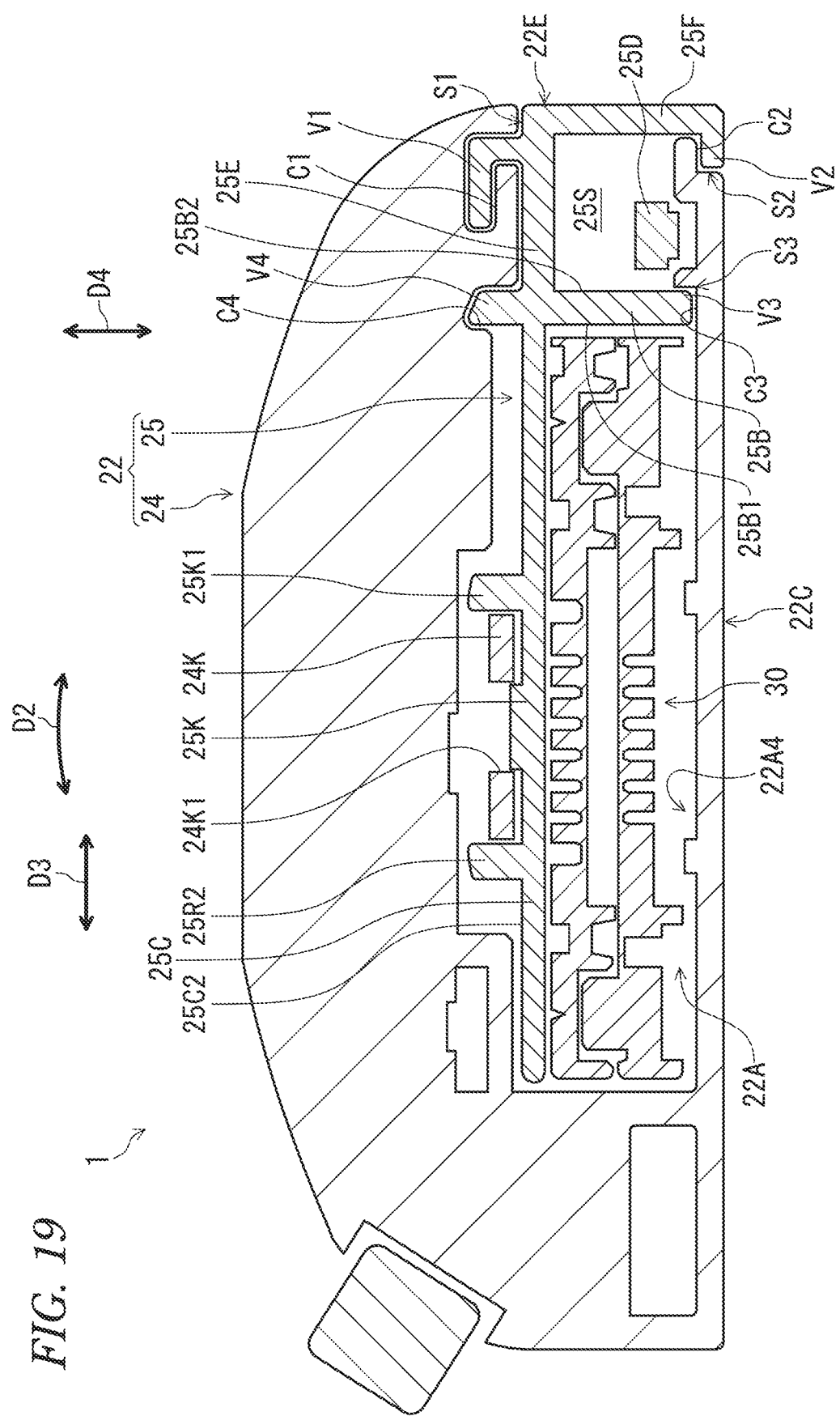
FIG. 19 is a cross-sectional view of the rotary connector device taken along line XIX-XIX of FIG. 16.

FIG. 19 is a cross-sectional view of the connector housing 22. As illustrated in FIG. 19, the connector housing space 22A includes a housing space 22A4. The housing space 22A4 communicates with the housing spaces 22A1 to 22A3 (FIG. 7). The electrical connector 30 and the connector support portion 25D of the second connector holder 25 are disposed in the housing space 22A4. The first gap S1 extends from the third outer surface 22E to the housing space 22A4. The third gap S3 extends from the holder housing space 24B (internal space 25S) to the housing space 22A4.

Figure 20:
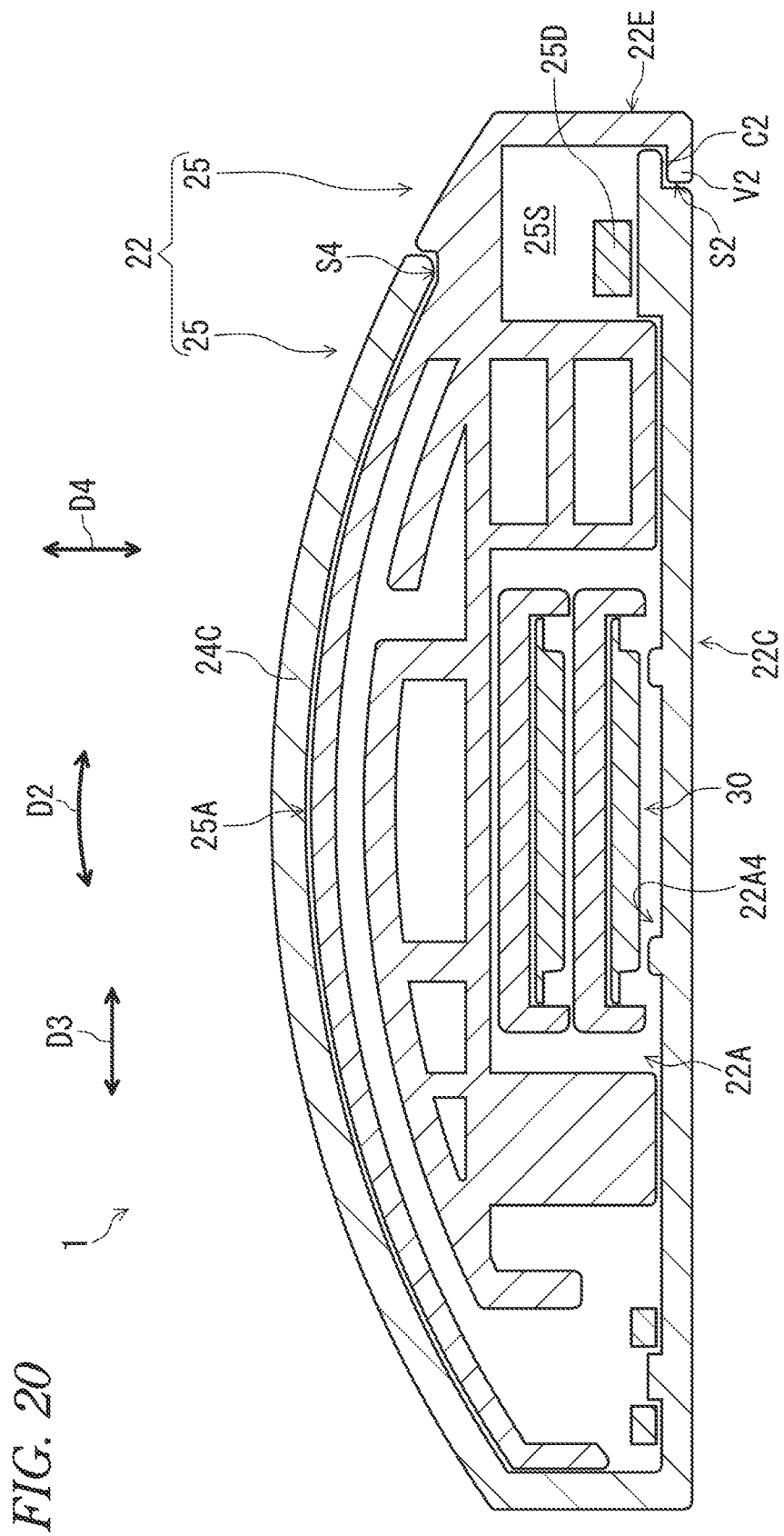
FIG. 20 is a cross-sectional view of the rotary connector device taken along line XX-XX of FIG. 16.

FIG. 20 is a cross-sectional view of the connector housing 22. As illustrated in FIG. 20, the connector housing 22 includes a fourth gap S4. The fourth gap S4 is provided between the first connector holder 24 and the second connector holder 25. More specifically, the first connector holder 24 includes a curved wall 24C. The fourth gap S4 is provided between the curved wall 24C and the connector support portion 25D. The fourth gap S4 extends along the curved wall 24C. As illustrated in FIG. 13, the curved wall 24C extends from the first holder main body 24A along the axial direction D1.

Figure 21:
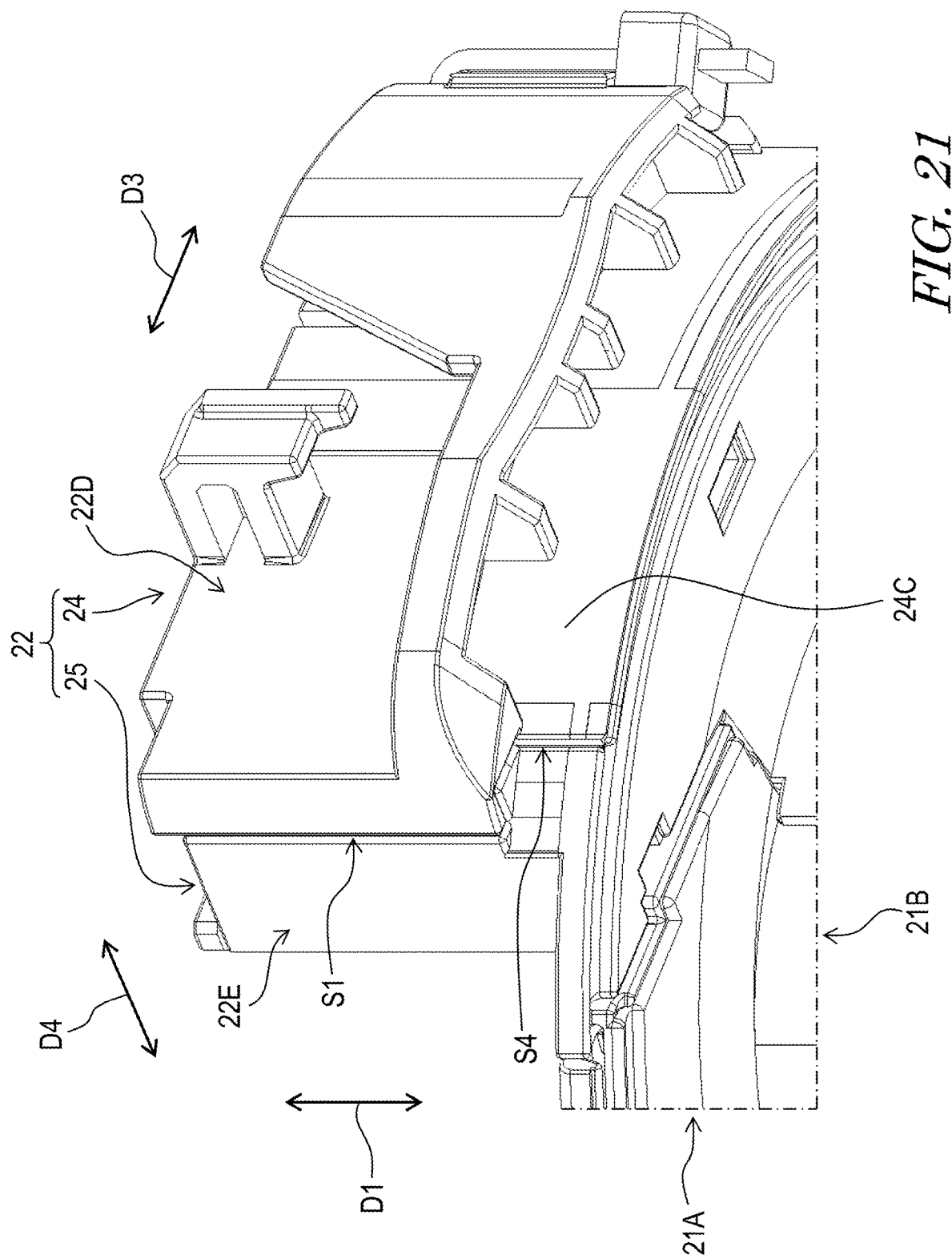
FIG. 21 is a perspective view of a first connector holder and a second connector holder of the rotary connector device illustrated in FIG. 1.

FIG. 21 is a perspective view of the connector housing 22. As illustrated in FIG. 21, the fourth gap S4 is connected to the first gap S1. Note that the fourth gap S4 may be omitted.

The features of the rotary connector device 1 are as follows.

(A1) As illustrated in FIG. 7, in the rotary connector device 1, since the first gap S1 extends from one of the third outer surface 22E and the fourth outer surface 22F toward the connector housing space 22A, for example, in a case where the liquid is spilled on the second outer surface 22D, it is possible to suppress the liquid from reaching the connector housing space 22A through the first gap S1. Therefore, the environmental resistance of the rotary connector device 1 can be enhanced.

Figure 22:
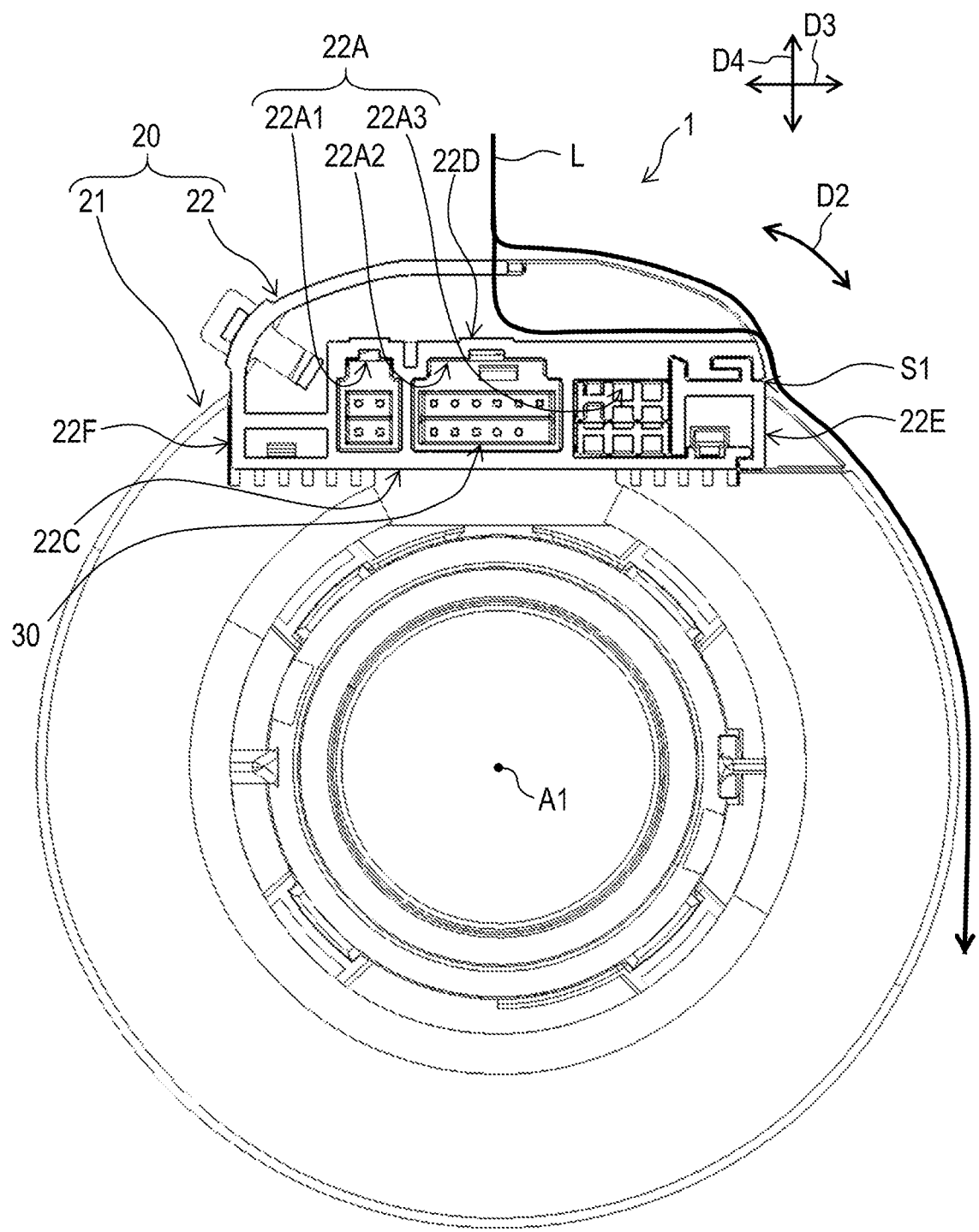
FIG. 22 is a view for explaining an effect of the rotary connector device illustrated in FIG. 1 (neutral state).

For example, as illustrated in FIG. 22, in the neutral state in which the rotor 20 is at the neutral position, the second outer surface 22D faces upward, and the third outer surface 22E and the fourth outer surface 22F face in the lateral direction. Therefore, even when a liquid L is spilled from the upper side of the rotary connector device 1 in the neutral state, the liquid L can be suppressed from reaching the connector housing space 22A through the first gap S1.

Figure 23:
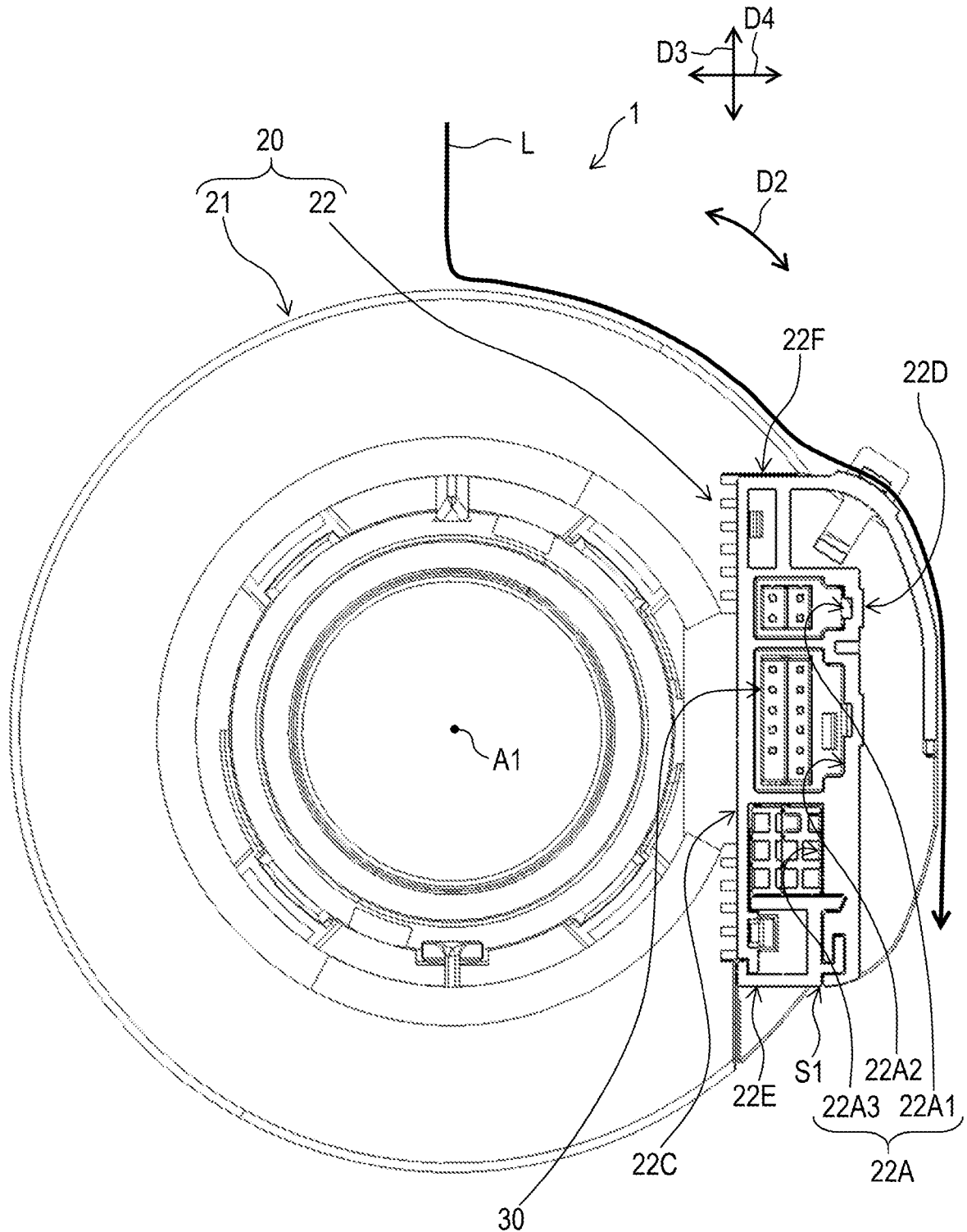
FIG. 23 is a view for explaining an effect of the rotary connector device illustrated in FIG. 1 (first rotation state).

As illustrated in FIG. 23, in the first rotation state in which the rotor 20 is rotated 90 degrees to the right from the neutral position, the second outer surface 22D faces the lateral direction, and the third outer surface 22E faces the downward direction. Therefore, even when the liquid L is spilled from the upper side of the rotary connector device 1 in the first rotation state, the liquid L can be suppressed from reaching the connector housing space 22A through the first gap S1.

(A2) As illustrated in FIG. 8, since the first gap S1 extends along the rotation axis A1, the coupling strength between the first connector holder 24 and the second connector holder 25 can be enhanced.

(A3) As illustrated in FIG. 7, the second outer surface 22D is provided only on the first connector holder 24 among the first connector holder 24 and the second connector holder 25. That is, since the gap between the first connector holder 24 and the second connector holder 25 does not exist on the second outer surface 22D, the environmental resistance of the rotary connector device 1 can be further enhanced.

(A4) As illustrated in FIG. 7, since the third outer surface 22E is provided on the first connector holder 24 and the second connector holder 25, the first gap S1 provided between the first connector holder 24 and the second connector holder 25 can be provided on the third outer surface 22E.

(A5) As illustrated in FIG. 7, the first gap S1 extends from the third outer surface 22E toward the connector housing space 22A. The fourth outer surface 22F is provided only on the first connector holder 24 among the first connector holder 24 and the second connector holder 25. That is, since the gap between the first connector holder 24 and the second connector holder 25 does not exist on the fourth outer surface 22F, the environmental resistance of the rotary connector device 1 can be further enhanced.

(A6) As illustrated in FIG. 7, by providing the first recess C1 and the first protrusion V1, the coupling strength between the first connector holder 24 and the second connector holder 25 can be enhanced.

(A7) As illustrated in FIG. 7, since the first gap S1 is provided at least partially between the first recess C1 and the first protrusion V1, the environmental resistance of the rotary connector device 1 can be enhanced while increasing the coupling strength between the first connector holder 24 and the second connector holder 25.

(A8) As illustrated in FIG. 7, since the first recess C1 and the first protrusion V1 are disposed between the housing outer surface 22B and the connector housing space 22A, the first recess C1 and the first protrusion V1 can be provided inside the connector housing 22, and the environmental resistance of the rotary connector device 1 can be enhanced while increasing the coupling strength between the first connector holder 24 and the second connector holder 25.

(A9) As illustrated in FIG. 7, the degree of design freedom of the first connector holder 24 and the second connector holder 25 can be enhanced by providing the second gap S2.

(A10) As illustrated in FIG. 7, by providing the second recess C2 and the second protrusion V2, the coupling strength between the first connector holder 24 and the second connector holder 25 can be enhanced.

(A11) As illustrated in FIG. 7, since the second gap S2 is provided at least partially between the second recess C2 and the second protrusion V2, the environmental resistance of the rotary connector device 1 can be enhanced while increasing the coupling strength between the first connector holder 24 and the second connector holder 25.

(A12) As illustrated in FIG. 7, since the second recess C2 and the second protrusion V2 are disposed between the housing outer surface 22B and the connector housing space 22A, the second recess C2 and the second protrusion V2 can be provided inside the connector housing 22, and the environmental resistance of the rotary connector device 1 can be enhanced while increasing the coupling strength between the first connector holder 24 and the second connector holder 25.

(A13) As illustrated in FIG. 7, by providing the third gap S3, the degree of design freedom of the first connector holder 24 and the second connector holder 25 can be enhanced.

(A14) As illustrated in FIG. 7, by providing the third recess C3 and the third protrusion V3, the coupling strength between the first connector holder 24 and the second connector holder 25 can be enhanced.

(A15) As illustrated in FIG. 7, since the third gap S3 is provided at least partially between the third recess C3 and the third protrusion V3, the environmental resistance of the rotary connector device 1 can be enhanced while increasing the coupling strength between the first connector holder 24 and the second connector holder 25.

(A16) As illustrated in FIG. 7, since the third recess C3 and the third protrusion V3 are disposed between the housing outer surface 22B and the connector housing space 22A, the third recess C3 and the third protrusion V3 can be provided inside the connector housing 22, and the environmental resistance of the rotary connector device 1 can be enhanced while increasing the coupling strength between the first connector holder 24 and the second connector holder 25.

(A17) As illustrated in FIG. 7, by providing the fourth recess C4 and the fourth protrusion V4, the coupling strength between the first connector holder 24 and the second connector holder 25 can be enhanced.

(A18) As illustrated in FIG. 7, since the first gap S1 is provided at least partially between the fourth recess C4 and the fourth protrusion V4, the environmental resistance of the rotary connector device 1 can be enhanced while increasing the coupling strength between the first connector holder 24 and the second connector holder 25.

(A19) As illustrated in FIG. 7, since the fourth recess C4 and the fourth protrusion V4 are disposed between the housing outer surface 22B and the connector housing space 22A, the fourth recess C4 and the fourth protrusion V4 can be provided inside the connector housing 22, and the environmental resistance of the rotary connector device 1 can be enhanced while increasing the coupling strength between the first connector holder 24 and the second connector holder 25.

In particular, in the connector housing 22, the first protrusion V1 is inserted into the first recess C1, and further, the fourth protrusion V4 adjacent to the first protrusion V1 and the first recess C1 is inserted into the fourth recess C4. Therefore, the shape of the first gap S1 can take a more complicated shape. Accordingly, in the direction (substantially the second direction D3) in which the liquid flows from the third outer surface 22E to the connector housing space 22A, the uneven structure can be doubly provided between the third outer surface 22E and the connector housing space 22A. Further, while the first protrusion V1 is inserted into the first recess C1 in the second direction D3, the fourth protrusion V4 is inserted into the fourth recess C4 in the first direction D4 different from the second direction D3. Therefore, it is possible to make the protruding direction of the double uneven structure different in the direction (substantially the second direction D3) in which the liquid flows from the third outer surface 22E to the connector housing space 22A. Therefore, by providing the labyrinth structure as illustrated in FIG. 7 in the connector housing 22, it is possible to more effectively suppress the liquid entering the first gap S1 from reaching the connector housing space 22A.

(A20) As illustrated in FIG. 7, when viewed along the rotation axis A1, since the length L3 of the third outer surface 22E is shorter than the length L2 of the second outer surface 22D, it is possible to shorten the time during which the liquid stays on the third outer surface 22E when the liquid is spilled on the housing outer surface 22B of the connector housing 22. Thus, the environmental resistance of the rotary connector device 1 can be enhanced.

Figure 24:
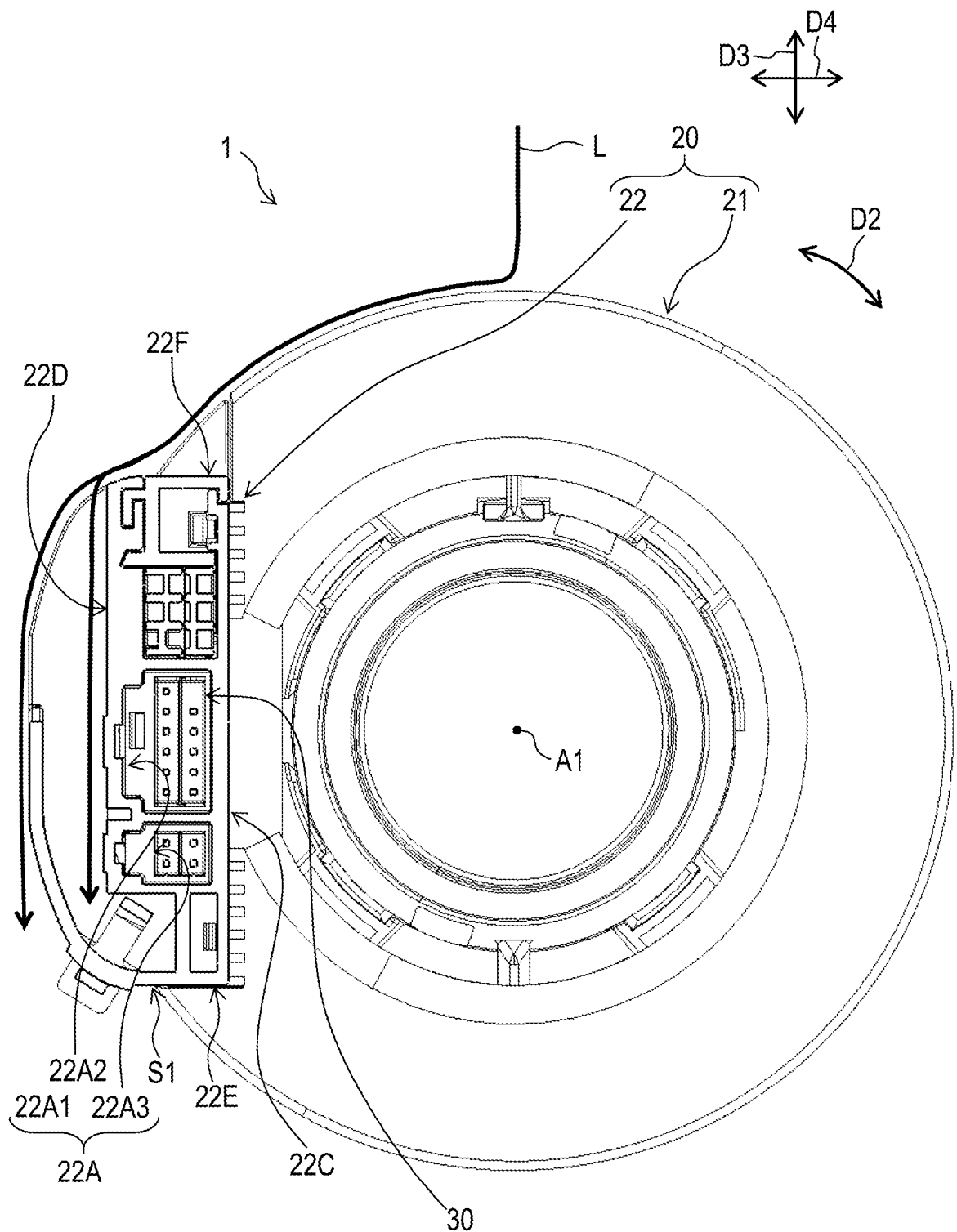
FIG. 24 is a view for explaining an effect of the rotary connector device illustrated in FIG. 1 (second rotation state).

For example, as illustrated in FIG. 24, in the second rotation state in which the rotor 20 is rotated 90 degrees to the left from the neutral position, the second outer surface 22D faces the lateral direction, and the third outer surface 22E faces the upward direction. However, since the length L3 of the third outer surface 22E is shorter than the length L2 of the second outer surface 22D, even when the liquid is spilled from the upper side of the rotary connector device 1 in the second rotation state, it is possible to suppress the liquid from reaching the connector housing space 22A through the first gap S1.

(B1) As illustrated in FIG. 10, since the second wall 25C is disposed opposite to the first gap S1 relative to the first wall 25B, the first wall 25B and the second wall 25C can suppress the liquid entering the connector housing space 22A from reaching the electrical connector 30. Therefore, the environmental resistance of the rotary connector device 1 can be enhanced.

Figure 25:
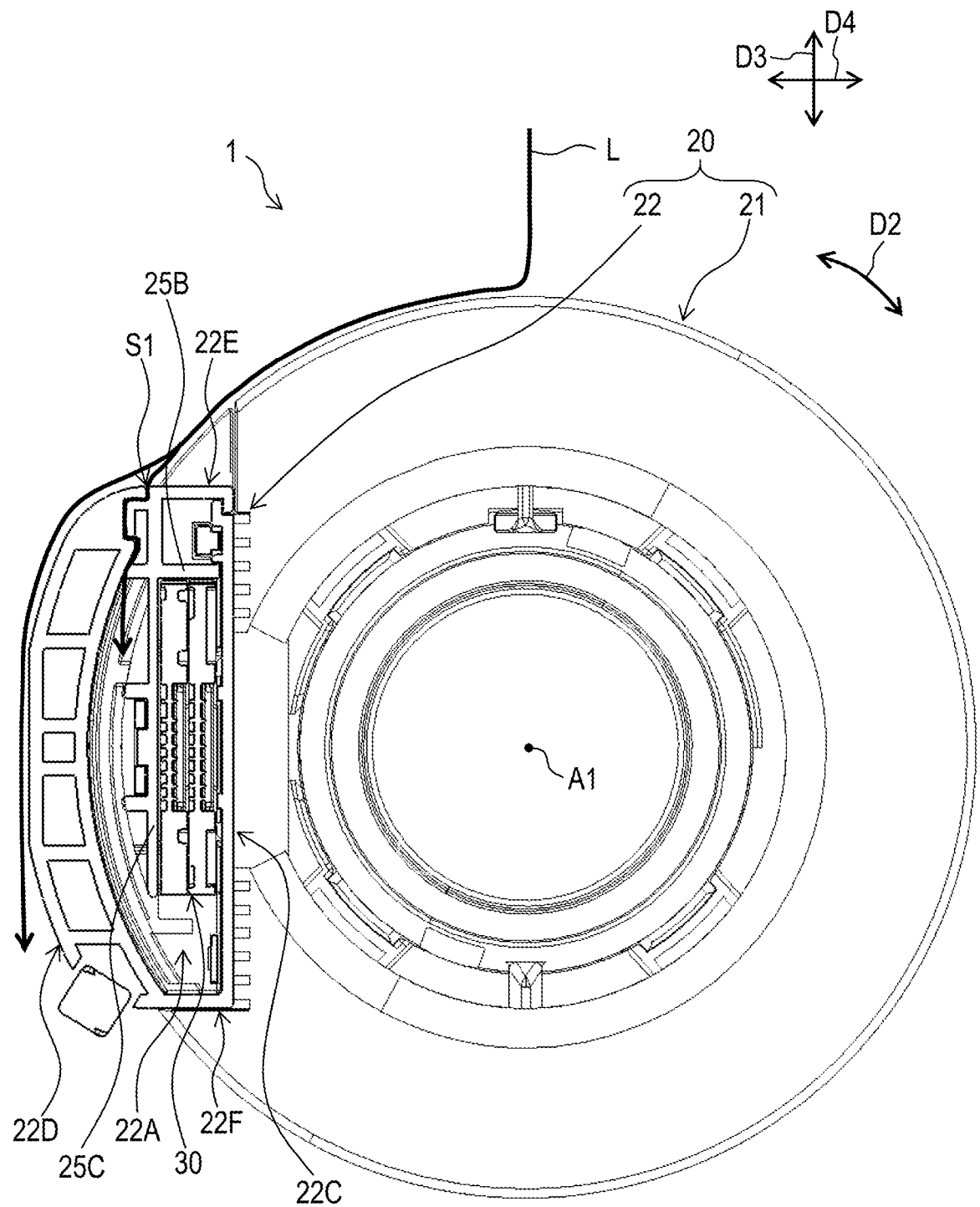
FIG. 25 is a view for explaining an effect of the rotary connector device illustrated in FIG. 1 (second rotation state).

For example, as illustrated in FIG. 25, in the second rotation state, the first wall 25B and the second wall 25C can suppress the liquid entering the connector housing space 22A through the first gap S1 from reaching the electrical connector 30 (see also FIG. 13).

Figure 26:
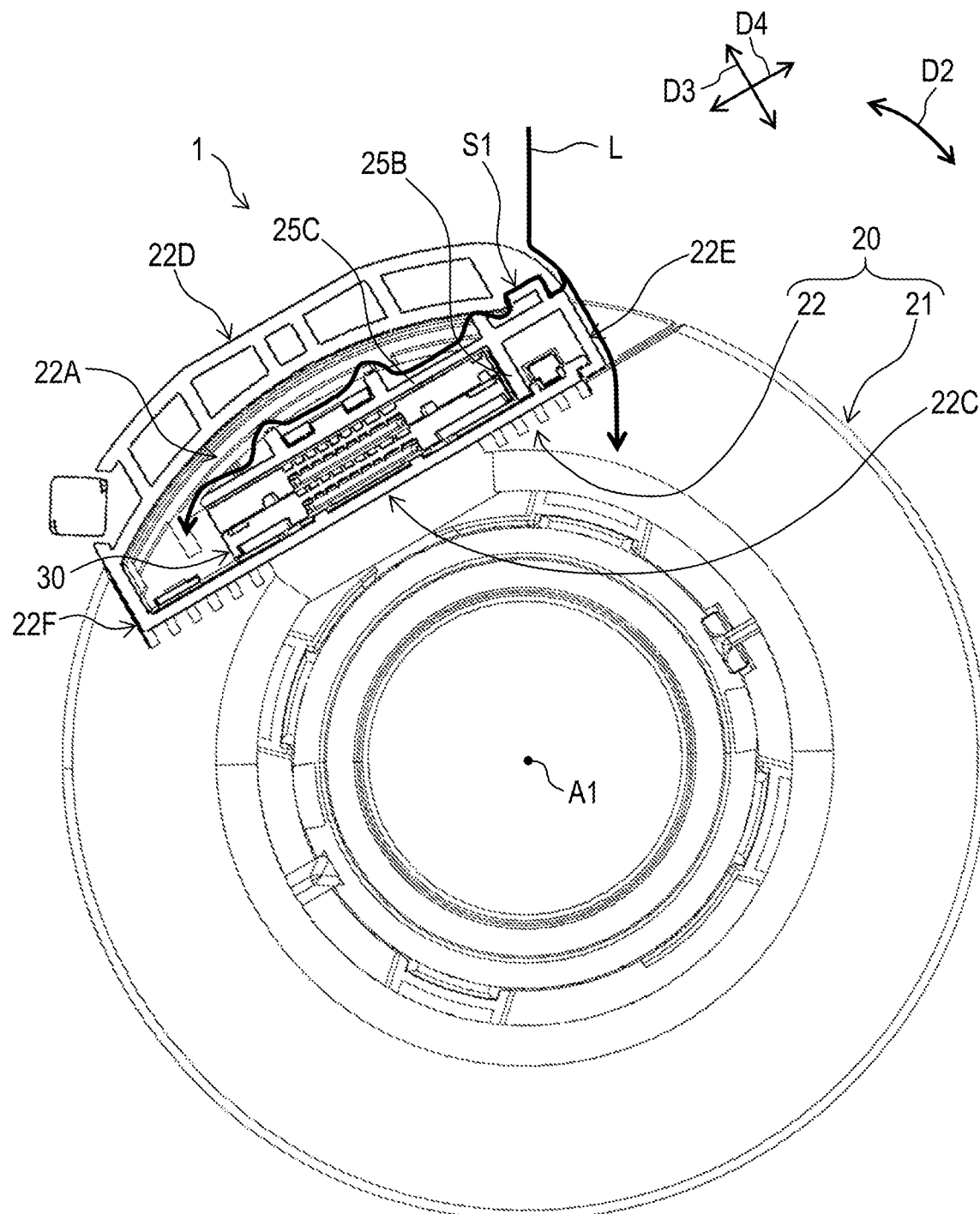
FIG. 26 is a view for explaining an effect of the rotary connector device illustrated in FIG. 1 (third rotation state).

Further, as illustrated in FIG. 26, in the third rotation state in which the rotor 20 is rotated 45 degrees to the left from the neutral position, the first wall 25B and the second wall 25C can suppress the liquid entering the connector housing space 22A through the first gap S1 from reaching the electrical connector 30 (see also FIG. 13).

(B2) As illustrated in FIG. 10, since the second direction D3 is perpendicular to the first direction D4, the first wall 25B and the second wall 25C can effectively suppress the liquid entering the connector housing space 22A from reaching the electrical connector 30.

(B3) As illustrated in FIG. 10, since the second length AL21 is longer than the first length AL11, the first wall 25B and the second wall 25C can more effectively suppress the liquid entering the connector housing space 22A from reaching the electrical connector 30.

(B4) As illustrated in FIG. 12, since the second axial length AL22 is shorter than the first axial length AL12, it is possible to effectively utilize the connector housing space 22A while suppressing the liquid entering the connector housing space 22A from reaching the electrical connector 30.

(B5) As illustrated in FIG. 10, since the first connector holder 24 includes the holder coupling portion 24K that couples the first connector holder 24 to the second wall 25C, the second wall 25C can be used to couple the first connector holder 24 and the second connector holder 25.

(B6) As illustrated in FIG. 10, the second connector holder 25 includes the coupling protrusion 25K provided on the second wall 25C. The holder coupling portion 24K is hooked to the coupling protrusion 25K so as to couple the first connector holder 24 to the second connector holder 25. Therefore, the coupling strength between the first connector holder 24 and the second connector holder 25 can be enhanced by using the second wall 25C.

(B7) As illustrated in FIG. 10, since the second wall 25C extends from the first wall 25B surface in the second direction D3, the first wall 25B and the second wall 25C can effectively suppress the liquid entering the connector housing space 22A from reaching the electrical connector 30.

(B8) As illustrated in FIG. 10, since the coupling protrusion 25K is provided on the surface of the fourth wall surface 25C2, the coupling strength between the first connector holder 24 and the second connector holder 25 can be enhanced by using the second wall 25C.

(B9) As illustrated in FIG. 10, since the coupling protrusion 25K is disposed between the first rib 25R1 and the second rib 25R2 in the second direction D3, the coupling strength between the first connector holder 24 and the second connector holder 25 can be effectively enhanced by using the second wall 25C.

Figure 27:
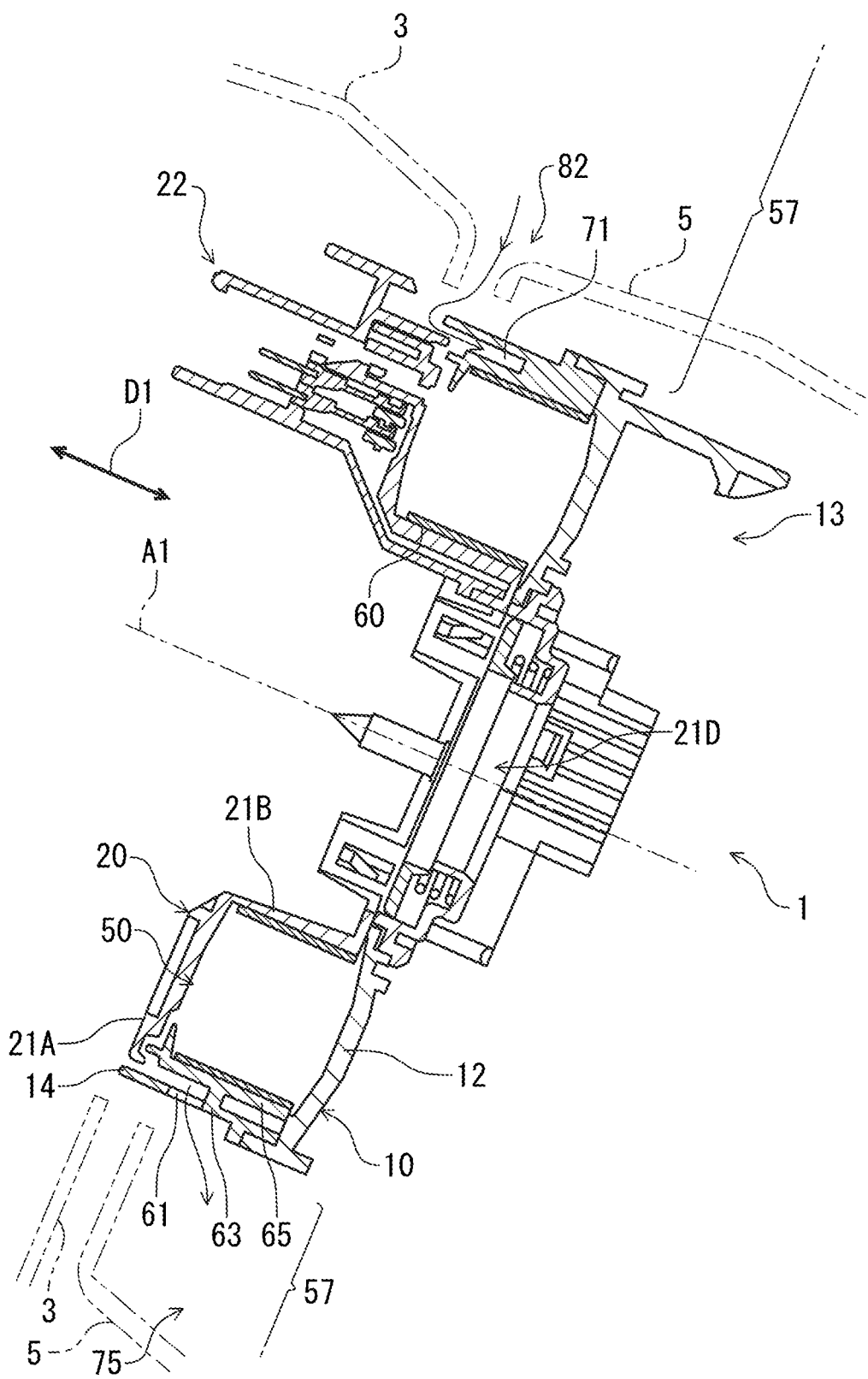
FIG. 27 is a cross-sectional view of a variation of the rotary connector device illustrated in FIG. 1.
Figure 28:
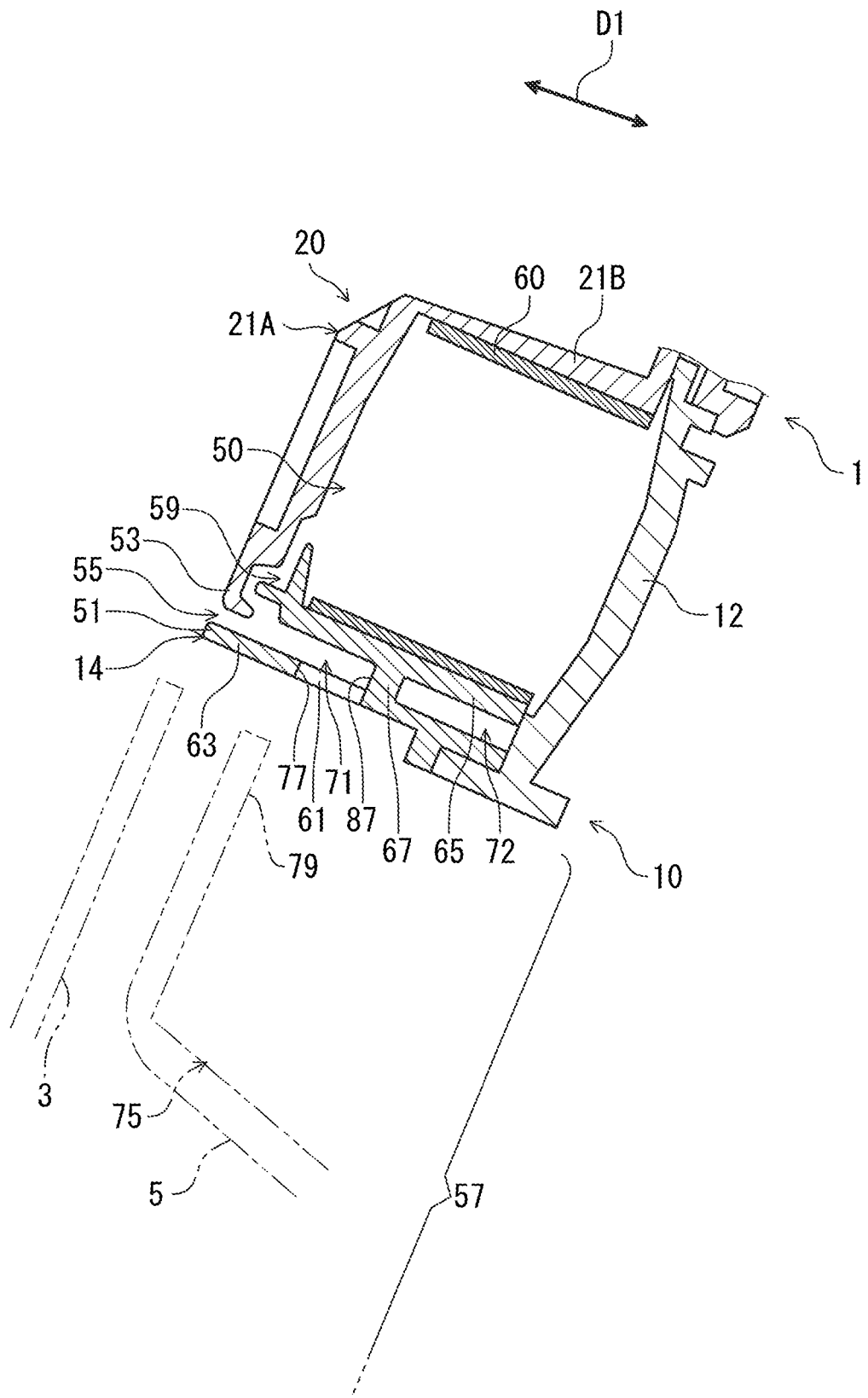
FIG. 28 is a partial cross-sectional view of the rotary connector device illustrated in FIG. 27.
Figure 29:
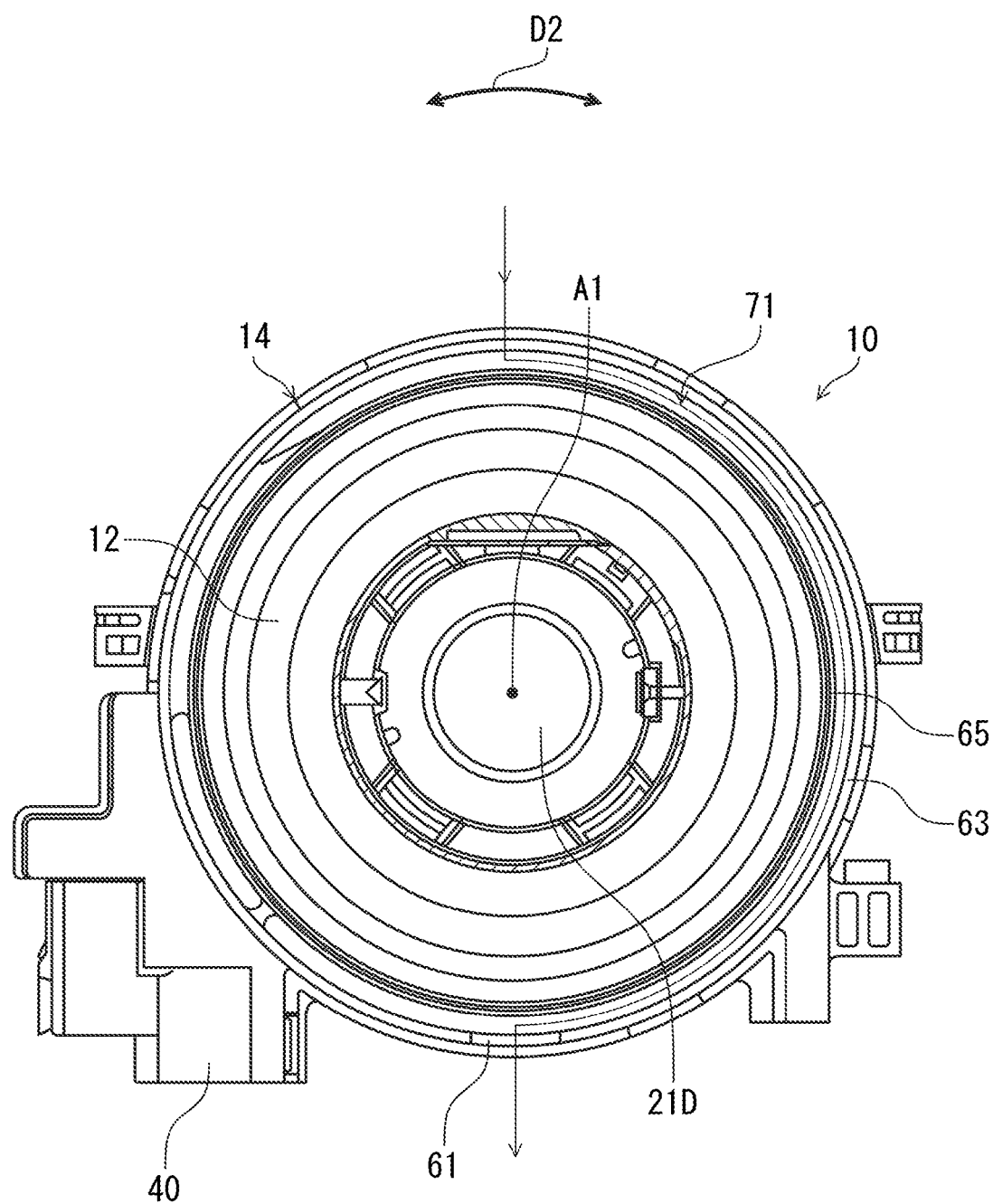
FIG. 29 is a partial cross-sectional side view of a stator of the rotary connector device illustrated in FIG. 27.

FIGS. 27 to 29 illustrate variations of the rotary connector device 1.

As illustrated in FIG. 27, the rotary connector device 1 according to the variation includes a cable housing 13. The cable housing 13 includes the stator 10 and the rotor 20. The cable housing 13 is formed in a circular shape. A through-hole 21D is formed at the center of the cable housing 13. The through-hole 21D is provided to penetrate the cable housing 13 in the axial direction D1. The entire housing of the rotary connector device 1 may be configured as the cable housing 13, or a part of the housing may be configured as the cable housing 13.

FIG. 28 is an enlarged view of a part of the lower side of FIG. 27. As illustrated in FIGS. 27 and 28, the stator 10 includes an annular stationary-side ring plate 12 and a cylindrical outer peripheral wall (outer peripheral portion) 14 provided at an outer peripheral edge portion of the stationary-side ring plate 12. The rotor 20 includes the annular rotating plate 21A and the cylindrical portion 21B having a cylindrical shape and provided on an inner peripheral edge portion of the rotating plate 21A.

In the present variation, each of the stationary-side ring plate 12 and the rotating plate 21A has an annular shape. The outer peripheral wall 14 and the cylindrical portion 21B each has a cylindrical shape.

The stationary-side ring plate 12 is disposed such that the thickness direction thereof faces the axial direction D1. The rotating plate 21A is arranged such that its thickness direction is oriented in the same direction as the stationary-side ring plate 12. In the present variation, the outer diameter of the rotating plate 21A is slightly smaller than the outer diameter of the stationary-side ring plate 12. The rotating plate 21A and the stationary-side ring plate 12 are disposed at positions separated from each other by a predetermined distance so as to face each other in the axial direction D1.

The outer peripheral wall 14 extends from an outer peripheral edge portion of the stationary-side ring plate 12 to one side of the axial direction D1. The cylindrical portion 21B extends from the inner peripheral edge portion of the rotating plate 21A to the other side of the axial direction D1. The cylindrical portion 21B has an outer diameter smaller than the inner diameter of the outer peripheral wall 14. The outer peripheral wall 14 is located radially outward of the cylindrical portion 21B. The outer peripheral wall 14 and the cylindrical portion 21B are disposed at positions separated from each other by a predetermined distance so as to face each other in the radial direction.

Thus, in the cable housing 13, the cable housing space 50 is formed between the stator 10 and the rotor 20 attached to the stator 10. The cable housing space 50 is an annular space surrounded by: the stationary-side ring plate 12 and the rotating plate 21A that face each other in the axial direction D1; and the outer peripheral wall 14 and the cylindrical portion 21B that face each other in the radial direction.

As illustrated in FIG. 28, the outer peripheral wall 14 is disposed such that one end portion 51 in the axial direction D1 faces an outer peripheral edge portion 53 of the rotating plate 21A in the radial direction. The one end portion 51 of the outer peripheral wall 14 in the axial direction D1 and the outer peripheral edge portion 53 of the rotating plate 21A are arranged at a predetermined interval in the radial direction. Thus, an intermediate gap 55 is formed between them.

The intermediate gap 55 opens to one side in the axial direction D1. The intermediate gap 55 extends in the circumferential direction of the outer peripheral wall 14 and the rotating plate 21A. The intermediate gap 55 is formed in an annular shape in the vicinity of the outer edge portion of the cable housing 13. The intermediate gap 55 connects an external space 57 of the cable housing 13 and the cable housing space 50. In the present variation, the intermediate gap 55 connects the external space 57 of the cable housing 13 and the cable housing space 50 to each other via a passage 59 formed between the outer peripheral wall 14 and the rotating plate 21A.

A discharge hole 61 is formed in the outer peripheral wall 14. The discharge hole 61 opens toward the outside of the cable housing 13 in the radial direction. That is, the discharge hole 61 is an opening different from the intermediate gap 55 in the cable housing 13 and opens in a direction different from the opening of the intermediate gap 55. The discharge hole 61 connects the external space 57 of the cable housing 13 and the internal space of a discharge groove 71 to each other.

Next, the discharge hole 61 will be described in detail. FIG. 29 is a partial cross-sectional side view of the stator 10.

As illustrated in FIGS. 27 to 29, the outer peripheral wall 14 has a double structure in the present variation. The outer peripheral wall 14 includes a first outer-circumferential cylindrical portion 63 in a cylindrical shape and a second outer-circumferential cylindrical portion 65 in a cylindrical shape. The second outer-circumferential cylindrical portion 65 has an outer diameter smaller than the inner diameter of the first outer-circumferential cylindrical portion 63, and is provided radially inside the first outer-circumferential cylindrical portion 63. The first outer-circumferential cylindrical portion 63 and the second outer-circumferential cylindrical portion 65 are disposed at positions separated from each other by a predetermined distance so as to face each other in the radial direction, and are disposed coaxially.

An intermediate portion in the axial direction of the first outer-circumferential cylindrical portion 63 and an intermediate portion in the axial direction of the second outer-circumferential cylindrical portion 65 are coupled by a coupling portion 67. The coupling portion 67 divides a space formed between the first outer-circumferential cylindrical portion 63 and the second outer-circumferential cylindrical portion 65 into two in the axial direction D1. Thus, the discharge groove 71 and an additional groove 72 are formed between the first outer-circumferential cylindrical portion 63 and the second outer-circumferential cylindrical portion 65.

The discharge groove 71 is disposed on one side of the coupling portion 67 in the axial direction D1. The additional groove 72 is disposed on the other side of the coupling portion 67 in the axial direction D1. The discharge groove 71 opens on one side in the axial direction such that the opening thereof faces the intermediate gap 55. The discharge groove 71 extends along the first outer-circumferential cylindrical portion 63 and the second outer-circumferential cylindrical portion 65. The discharge groove 71 has a circumferential length of at least about half the circumferential length of the outer peripheral wall 14.

The discharge groove 71 functions as a dust pool that retains foreign matter such as sand that has entered the rotary connector device 1. The discharge groove 71 is connected to the external space 57 of the cable housing 13 via the intermediate gap 55. The discharge groove 71 is also connected to the cable housing space 50 via the passage 59.

The discharge hole 61 is formed in the first outer-circumferential cylindrical portion 63. The discharge hole 61 radially penetrates the first outer-circumferential cylindrical portion 63 in the radial direction. Thus, the discharge hole 61 connects the internal space of the discharge groove 71 extending continuously in the circumferential direction of the outer peripheral wall 14 to the external space 57 of the cable housing 13.

The discharge hole 61 is disposed on one side (discharge groove 71 side) in the axial direction D1 relative to the coupling section with the coupling portion 67, in the first outer-circumferential cylindrical portion 63 in the axial direction D1. The discharge hole 61 is disposed so as to be connected to the deepest portion (a bottom portion 87) of the discharge groove 71. Further, when the rotary connector device 1 is installed, the discharge hole 61 is disposed so as to be positioned in the vicinity of the lowermost portion of the discharge groove 71, in the circumferential direction of the outer peripheral wall 14.

In the stator 10, a partition wall that partitions the discharge groove 71 in the circumferential direction is not particularly formed. Therefore, the inside of the discharge groove 71 is a space which is long and continuous in an arc shape between the lowermost portion where the discharge hole 61 is disposed and a portion (a portion positioned at the uppermost portion) whose phase is different by 180° from the lowermost portion.

Thus, when the rotary connector device 1 is installed, as illustrated in FIG. 27, the discharge hole 61 faces the internal space 75 of a column cover 5 in the external space 57 of the cable housing 13. At this time, one end portion 77 in the axial direction D1 of the discharge hole 61 is disposed at a position facing the internal space 75 of the column cover 5 or a lower end portion 79 of the column cover 5 in the axial direction. In the present variation, the discharge hole 61 has a slit shape.

FIG. 27 illustrates a state in which the rotary connector device 1 is provided at a predetermined position of the steering column. In this state, a case is considered in which liquid such as water enters the inside from an upper gap 82 among the gaps generated between a steering lower cover 3 and the column cover 5. This liquid is applied to the vicinity of the upper portion of the outer periphery of the rotary connector device 1. There is a possibility that a part of the liquid enters the internal space of the cable housing 13 of the rotary connector device 1 through the intermediate gap 55.

However, the opening end of the discharge groove 71 formed along the intermediate gap 55 is positioned in the vicinity of the annular intermediate gap 55. Therefore, in the range in which the discharge groove 71 is formed (at least a half circumference or more), even when the liquid enters from any position of the intermediate gap 55, in most cases, the liquid enters the discharge groove 71 and flows to the lowermost end portion along the discharge groove 71. FIG. 29 illustrates a state in which the liquid entering the uppermost end portion of the intermediate gap 55 flows to the lowermost end portion along the discharge groove 71.

At the lowermost end portion of the discharge groove 71, the discharge hole 61 is located near the bottom portion 87 of the discharge groove 71. Therefore, the liquid that has reached the lowermost end portion of the discharge groove 71 is discharged through the discharge hole 61 with little accumulation at the lowermost end portion. Since the liquid does not accumulate in the lower portion of the discharge groove 71, the liquid level does not rise in the lower portion of the discharge groove 71 and the liquid does not overflow into the cable housing space 50. Therefore, since a liquid such as water is not applied to the primary mold of the core wire welding portion of the electrical cable 60 disposed in the cable housing space 50, insulation failure can be suppressed.

As described above, the rotary connector device 1 of the present variation includes the stator 10, the rotor 20, and the electrical cable 60. The rotor 20 is relatively rotatably attached to the stator 10 while being positioned inside the stator 10 such that the annular cable housing space 50 is formed between the rotor 20 and the stator 10. The electrical cable 60 is housed in the cable housing space 50. The electrical cable 60 electrically connects the stator-side connector housing 40 provided in the stator 10 and the connector housing 22 provided in the rotor 20. The intermediate gap 55 connecting the external space 57 of the cable housing 13 composed of the stator 10 and the rotor 20 to the cable housing space 50 is formed between the stator 10 and the rotor 20. The stator 10 includes the outer peripheral wall 14 provided radially outside the cable housing space 50. The outer peripheral wall 14 includes: the discharge groove 71 provided radially outside the cable housing space 50 and extending in the circumferential direction; and the discharge hole 61 connected to the discharge groove 71. The discharge groove 71 is connected to the intermediate gap 55 and the cable housing space 50. The discharge hole 61 connects the discharge groove 71 and the external space 57.

Accordingly, by installing the rotary connector device 1 such that the discharge hole 61 is positioned at the lower portion, even when liquid such as water enters the inside from the intermediate gap 55 between the stator 10 and the rotor 20, the liquid can be reliably and quickly discharged using the discharge hole 61 after being preferentially guided to the discharge groove 71. Therefore, insulation failure in the rotary connector device 1 can be suppressed.

In addition, in the rotary connector device 1 of the present variation, the discharge groove 71 is provided continuously over a half circumference or more from the position connected to the discharge hole 61.

Accordingly, even when the liquid enters from various places (for example, at or near the upper portion of the rotary connector device 1) of the intermediate gap 55 in the circumferential direction, the liquid can be discharged from the discharge hole 61 at or near the lower portion of the rotary connector device 1 through the discharge groove 71.

Figure 30:
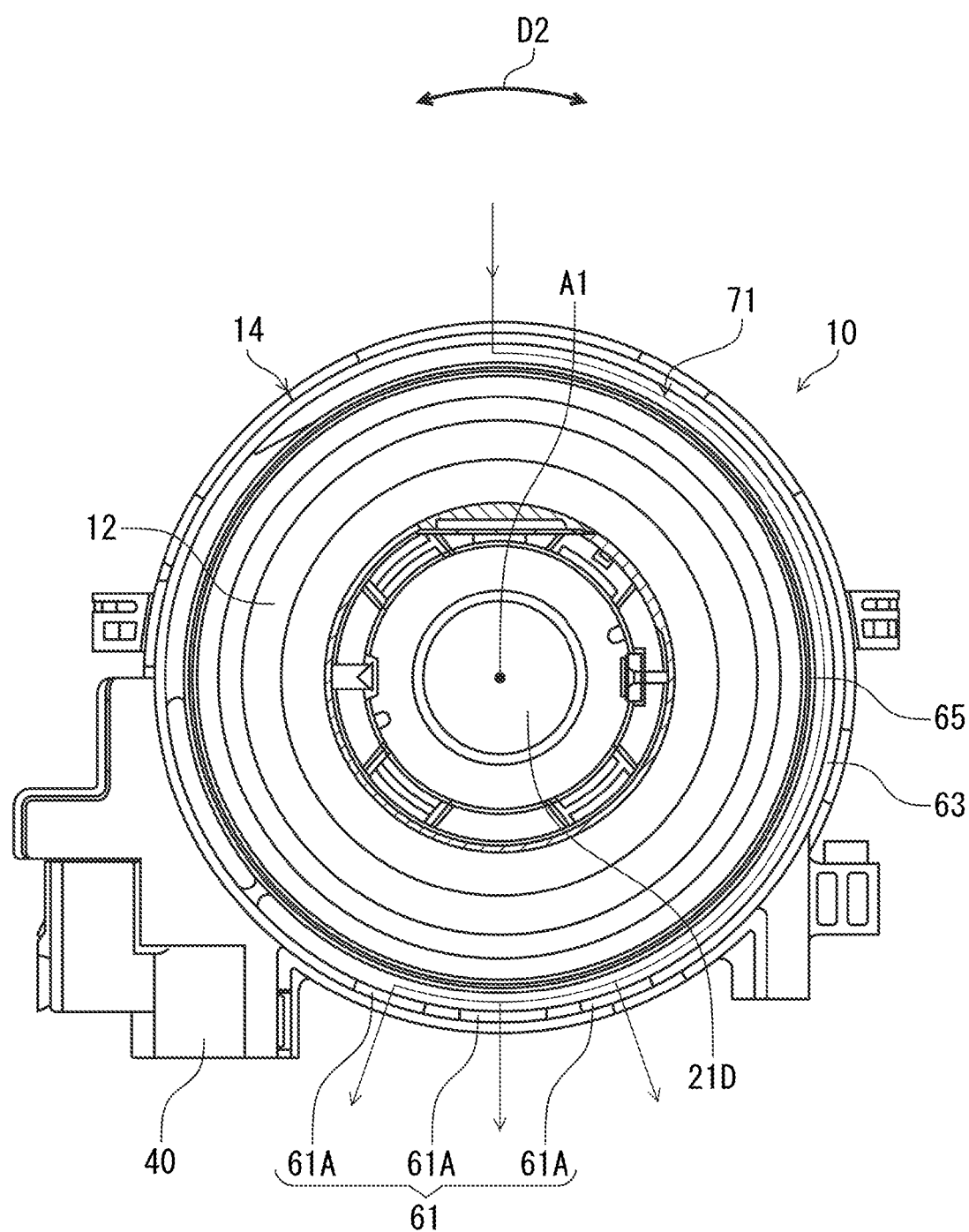
FIG. 30 is a partial cross-sectional side view of a variation of the stator illustrated in FIG. 29.

As illustrated in FIG. 30, the discharge hole 61 may include not only one hole but also a plurality of holes 61A.

When a plurality of the discharge holes 61 are formed, the liquid can be smoothly discharged.

In FIGS. 28 and 29, in the rotary connector device 1 of the present variation, the discharge hole 61 includes a slit.

Thus, it is possible to suppress foreign matter from entering the inside of the rotary connector device 1 through the discharge hole 61.

In the variation described above, the discharge hole 61 includes a slit. However, the shape of the discharge hole 61 is freely selectable, and may be, for example, a circular shape, a square shape, or the like.

The discharge hole 61 may be formed in a notch shape that opens the end portion of the first outer-circumferential cylindrical portion 63 on the side close to the opening of the discharge groove 71 (a notch for discharge is also included as the discharge hole).

The direction in which the discharge hole 61 is formed so as to pass through the first outer-circumferential cylindrical portion 63 may be the radial direction as in the above-described variation, or may be a direction inclined from the radial direction.

When the plurality of discharge holes 61 are formed, the plurality of discharge holes 61 may be formed so as to be concentrated in the vicinity of the lowermost portion, or may be formed so as to be arranged in a wide range in the circumferential direction.

The discharge groove 71 is preferably formed continuously over a half circumference or more as described above, but may be formed less than a half circumference.

It should be noted that, in the present application, "comprise" and its derivatives are non-limiting terms describing the presence of a component and do not exclude the presence of other components not described. This also applies to "have", "include" and their derivatives.

In the present application, a number such as "first" or "second" is merely a term for identifying a configuration, and does not have any other meaning (e.g., a particular order, or the like). For example, the presence of a "first element" does not imply that a "second element" exists, and the presence of a "second element" does not imply that a "first element" exists.

Expressions such as "parallel", "orthogonal", and "identical" in the present disclosure should not be interpreted strictly and include respectively the meanings of "substantially parallel", "substantially orthogonal", and "substantially identical". Further, representations of other arrangements are not to be strictly interpreted.

Furthermore, the expression "at least one of A and B" in the present disclosure encompasses, for example, all of (1) only A, (2) only B, and (3) both A and B. The expression "at least one of A, B, and C" encompasses, for example, all of (1) only A, (2) only B, (3) only C, (4) A and B, (5) B and C, (6) A and C, and (7) all of A, B, and C. In the present disclosure, the expression "at least one of A and B" is not interpreted as "at least one of A and at least one of B."

Various alterations and modifications of the disclosure are apparent from the foregoing disclosure. Accordingly, the disclosure may be implemented in a manner different from the specific disclosure of the present application without departing from the spirit of the disclosure.

What is claimed is:

1. A rotary connector device comprising:
a stator;
a rotor rotatable about a rotation axis relative to the stator; and
an electrical connector attached to the rotor,
the stator and the rotor defining a cable housing space between the stator and the rotor, the cable housing space being provided to surround the rotation axis,
the rotor comprising:
a rotor main body; and
a connector housing having a connector housing space that houses the electrical connector,
the connector housing comprising:
a first connector holder extending from the rotor main body away from the cable housing space along the rotation axis; and
a second connector holder that is a separate member from the first connector holder and is attached to the first connector holder, and
the second connector holder comprising:
a second holder main body comprising a connector support portion that supports the electrical connector;
a first wall extending from the second holder main body along an axial direction parallel to the rotation axis; and
a second wall extending from the second holder main body along the axial direction and coupled to the first wall,
the connector housing comprising:
a housing outer surface disposed so as to surround the connector housing space when viewed along the rotation axis; and
a first gap provided between the first connector holder and the second connector holder and extending from the housing outer surface toward the connector housing space,
the first wall extending in a first direction orthogonal to the axial direction, and being disposed between the connector housing space and the first gap, and
the second wall extending from the first wall in a second direction that is orthogonal to the axial direction and is different from the first direction, and being disposed opposite to the first gap relative to the first wall.

2. The rotary connector device according to claim 1, wherein
the second direction is orthogonal to the first direction.

3. The rotary connector device according to claim 1, wherein
the first wall has a first length defined in the first direction,
the second wall has a second length defined in the second direction, and
the second length is longer than the first length.

4. The rotary connector device according to claim 1, wherein
the first wall has a first axial length defined from the second holder main body in the axial direction,
the second wall has a second axial length defined from the second holder main body in the axial direction, and the second axial length is shorter than the first axial length.

5. The rotary connector device according to claim 1, wherein
the first connector holder comprises a holder coupling portion that couples the first connector holder to the second wall.

6. The rotary connector device according to claim 5, wherein
the second connector holder comprises a coupling protrusion provided on the second wall, and
the holder coupling portion is hooked to the coupling protrusion so as to couple the first connector holder to the second connector holder.

7. The rotary connector device according to claim 6, wherein
the first wall comprises a first wall surface facing the electrical connector, and
the second wall extends from the first wall surface in the second direction.

8. The rotary connector device according to claim 7, wherein
the second wall comprises:
a second wall surface facing the electrical connector; and
a fourth wall surface provided on a back side of the second wall surface, and
the coupling protrusion is provided on the fourth wall surface.

9. The rotary connector device according to claim 6, wherein
the second connector holder comprises:
a first rib extending from the second wall to opposite to the electrical connector; and
a second rib extending from the second wall to opposite to the electrical connector, the second rib being spaced apart from the first rib in the second direction, and
the coupling protrusion is disposed between the first rib and the second rib in the second direction.

10. A rotary connector device comprising:
a stator;
a rotor rotatable about a rotation axis relative to the stator; and
an electrical connector attached to the rotor,
the stator and the rotor defining a cable housing space between the stator and the rotor, the cable housing space being provided to surround the rotation axis,
the rotor comprising:
a rotor main body; and
a connector housing having a connector housing space that houses the electrical connector,
the connector housing comprising:
a first connector holder extending from the rotor main body away from the cable housing space along the rotation axis; and
a second connector holder that is a separate member from the first connector holder and is attached to the first connector holder, and
the second connector holder comprising:
a second holder main body comprising a connector support portion that supports the electrical connector;
a first wall extending from the second holder main body along an axial direction parallel to the rotation axis; and
a second wall extending from the second holder main body along the axial direction and coupled to the first wall,
the connector housing comprising:
a housing outer surface disposed so as to surround the connector housing space when viewed along the rotation axis; and
a first gap provided between the first connector holder and the second connector holder and extending from the housing outer surface toward the connector housing space,
the housing outer surface comprising:
a first outer surface facing toward the rotation axis;
a second outer surface disposed opposite to the first outer surface relative to the connector housing space so as to face radially outward;
a third outer surface disposed between the first outer surface and the second outer surface so as to face in a direction different from a direction in which the first outer surface faces; and
a fourth outer surface disposed opposite to the third outer surface relative to the connector housing space, and
the first gap extending from one of the third outer surface and the fourth outer surface toward the connector housing space.

11. The rotary connector device according to claim 10, wherein
the first gap extends along the rotation axis.

12. The rotary connector device according to claim 10, wherein
the second outer surface is provided only on the first connector holder among the first connector holder and the second connector holder.

13. The rotary connector device according to claim 10, wherein
the third outer surface is provided on the first connector holder and the second connector holder.

14. The rotary connector device according to claim 10, wherein
the first gap extends from the third outer surface toward the connector housing space, and
the fourth outer surface is provided only on the first connector holder among the first connector holder and the second connector holder.

15. The rotary connector device according to claim 10, wherein
one of the first connector holder and the second connector holder comprises a first recess, and
the other of the first connector holder and the second connector holder comprises a first protrusion provided in the first recess.

16. The rotary connector device according to claim 15, wherein
the first gap is provided at least partially between the first recess and the first protrusion.

17. The rotary connector device according to claim 15, wherein
the first recess and the first protrusion are disposed between the housing outer surface and the connector housing space.

18. The rotary connector device according to claim 10, wherein
the connector housing comprises: a second gap that is provided between the first connector holder and the second connector holder and extends from the housing outer surface toward the connector housing space.

19. The rotary connector device according to claim 18, wherein
one of the first connector holder and the second connector holder comprises a second recess, and
the other of the first connector holder and the second connector holder comprises a second protrusion provided in the second recess.

20. The rotary connector device according to claim 19, wherein
the second gap is provided at least partially between the second recess and the second protrusion.

21. The rotary connector device according to claim 19, wherein
the second recess and the second protrusion are disposed between the housing outer surface and the connector housing space.

22. The rotary connector device according to claim 10, wherein
the connector housing comprises: a third gap provided between the first connector holder and the second connector holder.

23. The rotary connector device according to claim 22, wherein
one of the first connector holder and the second connector holder comprises a third recess, and
the other of the first connector holder and the second connector holder comprises a third protrusion provided in the third recess.

24. The rotary connector device according to claim 23, wherein
the third gap is provided at least partially between the third recess and the third protrusion.

25. The rotary connector device according to claim 23, wherein
the third recess and the third protrusion are disposed between the housing outer surface and the connector housing space.

26. The rotary connector device according to claim 10, wherein
one of the first connector holder and the second connector holder comprises a fourth recess, and
the other of the first connector holder and the second connector holder comprises a fourth protrusion provided in the fourth recess.

27. The rotary connector device according to claim 26, wherein
the first gap is provided at least partially between the fourth recess and the fourth protrusion.

28. The rotary connector device according to claim 26, wherein
the fourth recess and the fourth protrusion are disposed between the housing outer surface and the connector housing space.

29. The rotary connector device according to claim 10, wherein
a length of the third outer surface is shorter than a length of the second outer surface when viewed along the rotation axis.

30. A rotary connector device comprising:
a stator;
a rotor rotatable about a rotation axis relative to the stator; and
an electrical connector attached to the rotor,
the stator and the rotor defining a cable housing space between the stator and the rotor, the cable housing space being provided to surround the rotation axis,
the rotor comprising:
a rotor main body; and
a connector housing having a connector housing space that houses the electrical connector,
the connector housing comprising:
a first connector holder extending from the rotor main body away from the cable housing space along the rotation axis; and
a second connector holder that is a separate member from the first connector holder and is attached to the first connector holder, and
the second connector holder comprising:
a second holder main body comprising a connector support portion that supports the electrical connector;
a first wall extending from the second holder main body along an axial direction parallel to the rotation axis; and
a second wall extending from the second holder main body along the axial direction and coupled to the first wall,
an intermediate gap being provided between the stator and the rotor, the intermediate gap connecting an external space of a cable housing to the cable housing space, the cable housing including the stator and the rotor,
the stator comprising an outer peripheral wall provided radially outside the cable housing space,
the outer peripheral wall comprising:
a discharge groove that is provided radially outside the cable housing space and extends in a circumferential direction; and
a discharge hole connected to the discharge groove,
the discharge groove being connected to the intermediate gap and the cable housing space, and
the discharge hole connecting the discharge groove and the external space.

31. The rotary connector device according to claim 30, wherein
the discharge groove is provided continuously over a half circumference or more from a position connected to the discharge hole.

32. The rotary connector device according to claim 30, wherein
the discharge hole comprises a plurality of holes.

33. The rotary connector device according to claim 30, wherein
the discharge hole comprises a slit.

* * * * *